(12) United States Patent
Chatani et al.

(10) Patent No.: US 7,113,693 B1
(45) Date of Patent: Sep. 26, 2006

(54) DATA TRANSMITTING AND RECEIVING USING RECORDING MEDIUM ID

(75) Inventors: Masayuki Chatani, Tokyo (JP); Akio Ohba, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/388,781

(22) Filed: Sep. 2, 1999

(30) Foreign Application Priority Data

Sep. 4, 1998 (JP) ................................. 10-251425
Aug. 24, 1999 (JP) ................................. 11-236940

(51) Int. Cl.
*H04N 5/91* (2006.01)
*H04N 7/00* (2006.01)

(52) U.S. Cl. .......................................... 386/94; 386/46
(58) Field of Classification Search .................... 386/1, 386/45, 96, 115, 176; 360/60; 380/201, 380/202, 203, 229, 251; 705/51, 57; 713/161, 713/165, 167, 168, 182, 183, 184, 185, 189, 713/192; 463/1, 40, 41, 42, 43, 44, 45; H04N 5/76, H04N 5/781
See application file for complete search history.

(56) References Cited

U.S. PATENT DOCUMENTS

| | | | | |
|---|---|---|---|---|
| 5,488,409 A | * | 1/1996 | Yuen et al. ................... 725/41 |
| 5,857,021 A | * | 1/1999 | Kataoka et al. ............... 705/54 |
| 6,014,352 A | * | 1/2000 | Kubota et al. ........... 369/30.05 |
| 6,097,814 A | * | 8/2000 | Mochizuki .................... 380/44 |
| 6,132,315 A | * | 10/2000 | Miyamoto et al. ............. 463/43 |
| 6,229,896 B1 | * | 5/2001 | Gotoh et al. ................ 380/203 |
| 6,278,984 B1 | * | 8/2001 | Itami et al. ................... 705/57 |
| 6,389,217 B1 | * | 5/2002 | Ohno et al. ................... 386/46 |
| 6,615,353 B1 | * | 9/2003 | Hashiguchi ................. 713/185 |

FOREIGN PATENT DOCUMENTS

| | | |
|---|---|---|
| EP | 0 669 580 | 8/1995 |
| EP | 0 691 762 | 1/1996 |
| EP | 0 782 084 | 7/1997 |
| JP | 07-239779 | 8/1995 |
| JP | 08-023315 | 1/1996 |
| JP | 08-278879 | 10/1996 |
| JP | 10-022871 | 1/1998 |

OTHER PUBLICATIONS

Office Action of Mar. 8, 2005 Japanese Patent Application No. 11-236940, and Partial Translation.
Translation of Office Action issued for corresponding Korean Patent Application No. 10-2000-7004799.

* cited by examiner

Primary Examiner—Robert Chevalier
(74) Attorney, Agent, or Firm—Frommer Lawrence & Haug LLP; William S. Frommer

(57) ABSTRACT

A video game apparatus has a package medium demodulator for a package medium having an ID such as a disk number and a CPU. The CPU reads a certain program and/or data from the package medium via the package medium demodulator and executes the program and/or processes the data if a disk number designated by data received via an antenna and a communication data demodulator agrees with the disk number of the package medium which is read by the package medium demodulator.

16 Claims, 17 Drawing Sheets

CONTROL ITEMS

APPARATUS CONNECTION INTERFACE

MEMORY INTERFACE

DISPLAY INTERFACE

CONTROL INPUT INTERFACE

SOUND INTERFACE

WIRELESS COMMUNICATION INTERFACE

CLOCK MANAGEMENT INTERFACE

PROGRAM DOWNLOAD INTERFACE

DATA TRANSMITTING AND RECEIVING USING RECORDING MEDIUM ID

BACKGROUND OF THE INVENTION

1. Field of the Invention

The present invention relates to a data transmitting and receiving system for receiving data transmitted from a data transmitting apparatus with a data receiving apparatus, a data receiving apparatus for receiving transmitted data, and a data transmitting apparatus for transmitting data.

2. Description of the Related Art

Conventional apparatus available for processing data and executing programs include personal computers and video game apparatus.

The video game apparatus execute a video game based on an application program stored in a recording medium such as an optical disk or the like. One popular recording medium widely used in recent years is a CD-ROM (Compact Disk Read-Only Memory) as a mass storage medium. Most video game apparatus read an application program stored in a CD-ROM and executes the read application program to play a video game.

The video game apparatus which execute the video game based on the application program stored in the recording medium can be referred to as information processing apparatus which are made interactive by the recording medium.

Recent years have seen many network systems for providing users with various forms of information by way of communications and broadcasts. For example, such network systems include Internet service systems, satellite television broadcasting systems, pager reception systems, etc., and are capable of presenting various items of information to users on a real-time basis.

The video game apparatus described above are usually used without being connected to the above network systems. Even if a video game apparatus is connected to a network system, the video game apparatus is limited to only an ability to use data obtained from the network system.

Information processing apparatus such as video game apparatus will be of high utility value if they can be connected to network systems, can receive real-time data from the network systems, and are interactive with the network systems. Stated otherwise, it is highly advantageous for information processing apparatus such as video game apparatus to be able to keep data of their own and data from the networks mutually related to each other.

SUMMARY OF THE INVENTION

It is therefore an object of the present invention to provide a data transmitting and receiving system, a data receiving apparatus, and a data transmitting apparatus which allow an information processing apparatus to use real-time data for interactive information processing.

According to the present invention, there is provided a data transmitting and receiving system has a data transmitting apparatus and a data receiving apparatus, the data receiving apparatus having a reader for reading a recording medium with a recorded ID and control means. The control means controls the reader to read a program and/or data from the recording medium and executes the program and/or processes the data if an ID designated by data received by the data receiving apparatus agrees with the ID of the recording medium which is read by the reader. Therefore, the program can be executed and/or the data can be processed depending on the received data.

The control means may stop executing the program and playing back the received data if an instruction to stop the program is detected in the program while the program is being executed. It is thus possible to provide software contents based on real-time communications and recording medium interactivity.

The control means may temporarily stop executing the program and playing back the received data if an instruction to stop the program is detected in the program while the program is being executed, confirm whether the received data being played back contains an instruction to end the execution of the program which is being temporarily stopped or not, end the execution of the program which is being temporarily stopped if the received data being played back contains an instruction to end the execution of the program, and resume the execution of the program if the received data being played back does not contain an instruction to end the execution of the program. Consequently, the stopping and resumption of the execution of the program can be controlled according to the contents of the received data.

According to the present invention, there is also provided a data transmitting and receiving system comprising a data transmitting apparatus and a plurality of data receiving apparatus, each of the data receiving apparatus having a reader for reading a recording medium with a recorded ID and control means, the control means comprising means for controlling the reader to read a program and/or data from the recording medium and substantially simultaneously starting to execute the program and/or process the data if an ID designated by data received by each of the data receiving apparatus agrees with the ID of the recording medium which is read by the reader.

According to the present invention, there is further provided a data receiving apparatus having a data reception function, comprising a reader for reading a recording medium having an ID specifying itself, and control means for controlling the reader to read a program and/or data from the recording medium and executing the program and/or process the data if an ID designated by received data agrees with the ID of the recording medium which is read by the reader. The control means may stop executing the program and playing back the received data if an instruction to stop the program is detected in the program while the program is being executed. It is thus possible to provide software contents based on real-time communications and recording medium interactivity.

Alternatively, the control means may temporarily stop executing the program and playing back the received data if an instruction to stop the program is detected in the program while the program is being executed, confirm whether the received data being played back contains an instruction to end the execution of the program which is being temporarily stopped or not, end the execution of the program which is being temporarily stopped if the received data being played back contains an instruction to end the execution of the program, and resume the execution of the program if the received data being played back does not contain an instruction to end the execution of the program. Consequently, the stopping and resumption of the execution of the program can be controlled according to the contents of the received data.

The data receiving apparatus may comprise a video game apparatus.

Alternatively, the data receiving apparatus may comprise a personal computer.

According to the present invention, there is also provided a data transmitting apparatus for transmitting data, wherein the transmitted data contains the ID of a particular recording medium. Thus, the data receiving apparatus which has received the transmitted data can perform controlling operations related to the ID of the particular recording medium.

Furthermore, the transmitted data may contain the name of a file in the particular recording medium and/or data identifying a recording area in the particular recording medium. Therefore, a program recorded under the name of a file in the particular recording medium or data recorded in the recording area in the particular recording medium can be used.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 19 is a diagram showing control items controlled by a control means in the portable electronic device.

DESCRIPTION OF THE PREFERRED EMBODIMENTS

Embodiments of the present invention will be described below with reference to the accompanying drawings. In the embodiments, a data transmitting and receiving system according to the principles of the present invention is constructed as a data broadcasting system including a video game apparatus with a data receiving function as a data reception terminal.

Figure 1:
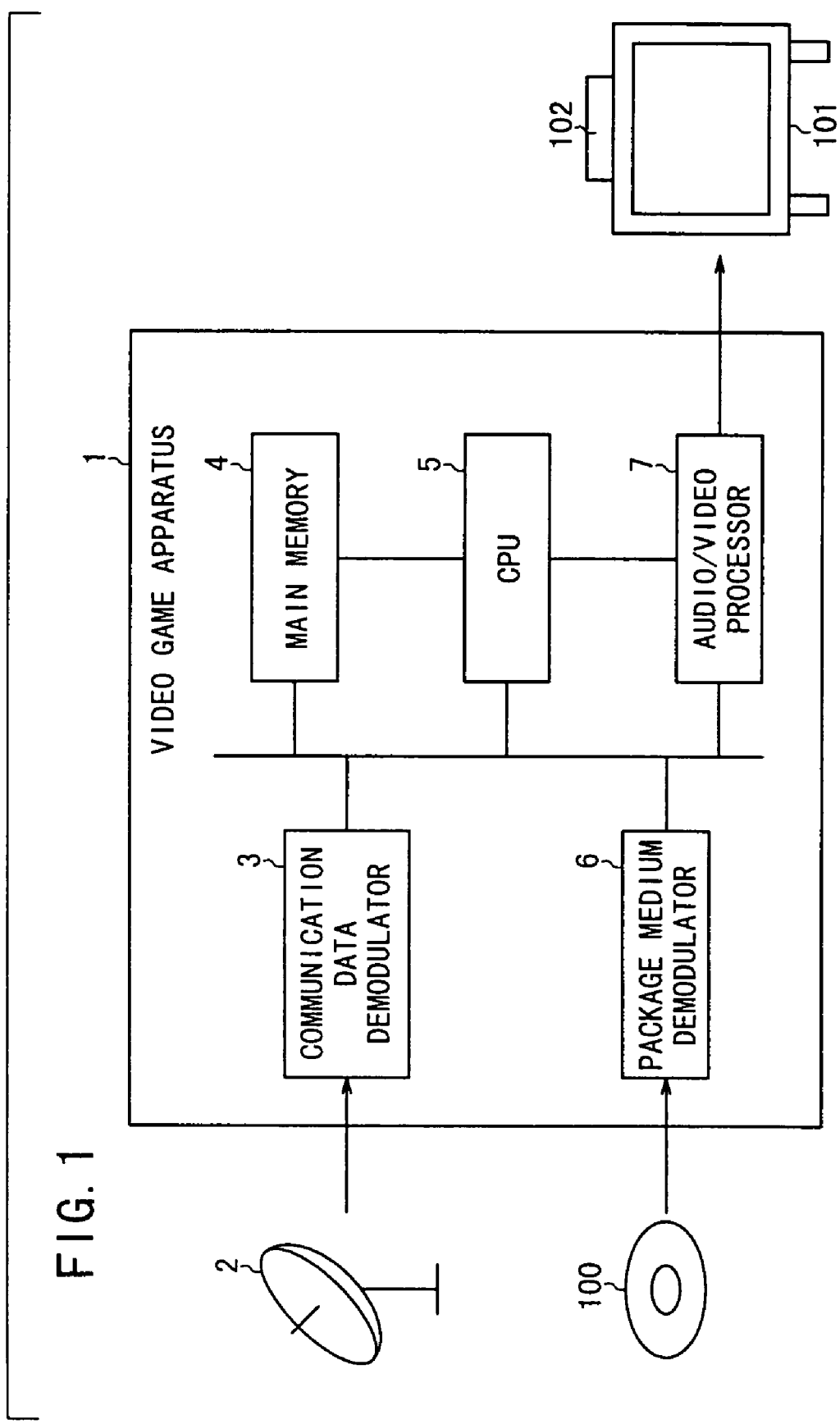
FIG. 1 is a block diagram of a video game apparatus having a communication data receiving function according to the present invention.

As shown in FIG. 1, a video game apparatus 1 as a data receiving apparatus having a data receiving function comprises an antenna 2 as a receiving means for receiving transmitted data, a communication data demodulator 3, a main memory 4, and a CPU 5 as a control means having a data processing control function to control data processing based on data control information contained in data received by the receiving means.

The video game apparatus 1 also comprises a package medium demodulator 6 as reader (also referred to as a drive unit or an access unit) for reading an application program or the like from a package medium 100 which serves as a recording medium with the application program or the like recorded therein, and an audio/video processor 7 for outputting images from a television receiver 101.

The video game apparatus 1 is arranged to perform a video game according to the application program stored in the package medium 100, and to receive data broadcast from a broadcasting station (described below) serving as a data transmitting apparatus.

Figure 2:
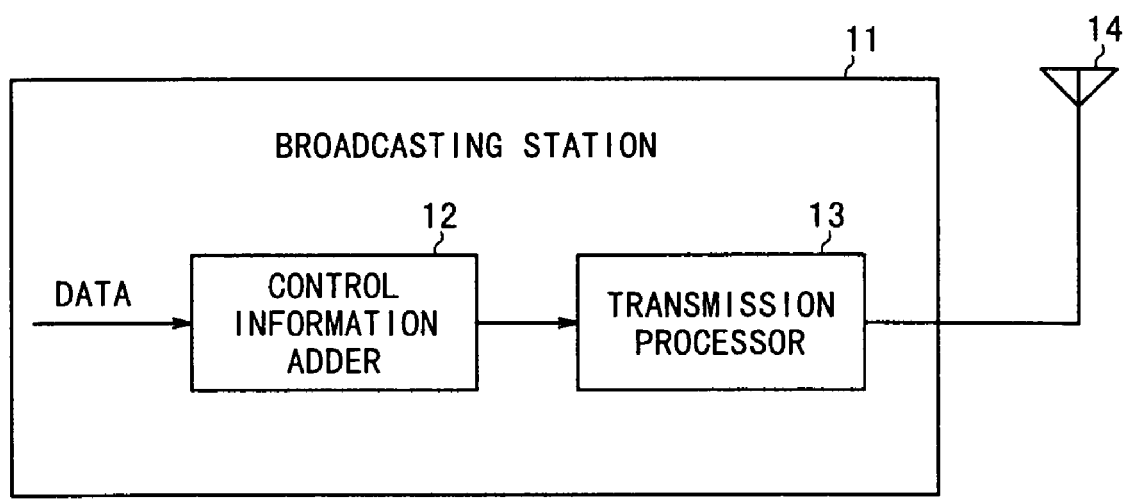
FIG. 2 is a block diagram of a broadcasting station according to the present invention.

As shown in FIG. 2, a broadcasting station 11 for transmitting data to the video game apparatus 1 comprises a control information adder 12 for adding data control information to data to be transmitted, for controlling the processing of data in the video game apparatus 1, and a transmission processor 13 for transmitting the data with the data control information added thereto via an antenna 14.

The components of the video game apparatus 1 and the broadcasting station 11 will be described in detail below. The package medium demodulator 3 has a function to demodulate data that has been broadcast from the broadcasting station 11 via the antenna 14 and received by the receiving antenna 2.

The package medium demodulator 6 has a function to demodulate and read various data recorded in the package medium 100.

In this embodiment, the package medium 100 is a mass storage medium such as a CD-ROM, a DVD, or the like. However, the package medium 100 is not limited to those disks, but may be any desired recording medium such as a semiconductor memory, a tape medium, or the like.

The package medium 100 stores an application program as an executable file and image and sound data as data. The image and sound data are data that can be reproduced when the application program stored in the package medium 100 is executed.

The main memory 4 comprises a memory means for storing various data. The main memory 4 stores, for example, various data such as the application program stored in the package medium 100 which has been read by the package medium demodulator 6, received data demodulated by the communication data demodulator 3, etc.

The audio/video processor 7 has a function to process image and sound data so that these image and sound data can be outputted from the television receiver 101 as an image and sound output device. The audio/video processor 7 performs a data processing process for enabling the television receiver 101 to output image and sound data. The television receiver 101 has a set top box 102 for receiving satellite broadcasts.

The image and sound output device is not limited to the television receiver 101, but may be a monitor for use with a personal computer.

The CPU 5 has a function as a control means for controlling various components of the video game apparatus 1.

Specifically, the CPU 5 has a data processing control function to control the execution of the application program stored in the package medium 100 based on the data control information contained in the received data. That is, the CPU 5 interprets and executes the data control information (special data) according to a special data processing program or the like. The special data processing program is a program written in the main memory 4 by initial settings, as described later on.

Depending on the application program that is executed, the CPU 5 has a function to process the received data from the broadcasting station 11 according to the application program.

The application program may include a game program, a data decoding program, etc., for example.

The control information adder 12 in the broadcasting station 11 has a function to add data control information to data to be transmitted. The data control information added to the data by the control information adder 12 comprises medium identification information, medium data position information, and control information, as shown in Table 1 below.

TABLE 1

Contents of special data (data control information)

| Title of information | Specific example |
| --- | --- |
| Medium identification information | Designated disk number |
| Medium data position information | Execution file name or track and sector numbers where execution file is recorded |
| Start/end control information | Execution start instruction, execution end instruction, forced end instruction |

Specifically, the medium identification information is a recording medium ID (identification) information for identifying recording mediums such as the package medium 100, and specifically comprises a designated disk number (particular disk number). The ID information serves to identify or confirm a recording medium itself.

The medium data position information represents an execution file name indicating a recorded position of the application program to be executed in the recording medium (package medium 100), or track and sector numbers where such an execution file is present. Stated otherwise, the medium data position information is information for reading a file to be processed by the video game apparatus 1.

The start/end control information comprises an execution start instruction information which is start instruction information for instructing a start of data processing, and an execution end instruction information or forced end instruction information which is end instruction information for instructing an end of data processing. Stated otherwise, the start/end control information is information for starting or ending the execution of a file to be processed by the video game apparatus 1.

The transmission processor 13 is constructed as a component for transmitting the above data control information. The transmission processor 13 modulates data to be transmitted, for example. The data modulated by the transmission processor 13 is broadcast by the antenna 14.

Figure 3:
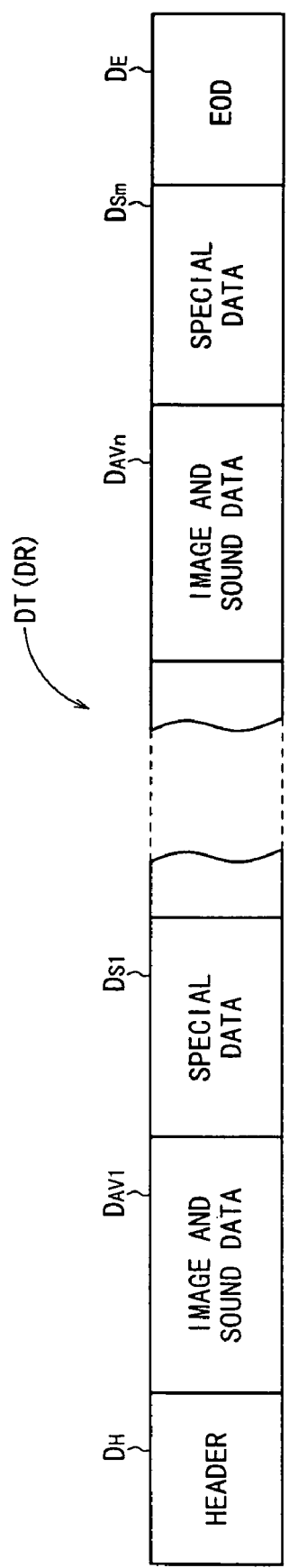
FIG. 3 is a diagram showing, by way of example, a data format of data broadcast from the broadcasting station.

FIG. 3 shows by way of example a data format of data DT transmitted from the transmission processor 13. As shown in FIG. 3, the transmitted data DT comprises a header $_{DH}$ for storing various items of information of the transmitted data DT, image and sound data $D_{AV1}, \ldots, D_{AVn}$ (n: integer) representing image and sound information, special data $D_{S1}, \ldots, D_{Sm}$ (m: integer) representing data control information, and end-of-data information EOD ($D_E$). The image and sound data $D_{AV1}, \ldots, D_{AVn}$ (n: integer) and the special data $D_{S1}, \ldots, D_{Sm}$ (m: integer) are multiplexed and transmitted.

The video game apparatus 1 and the transmission processor 11 are constructed as described above.

Figure 4:
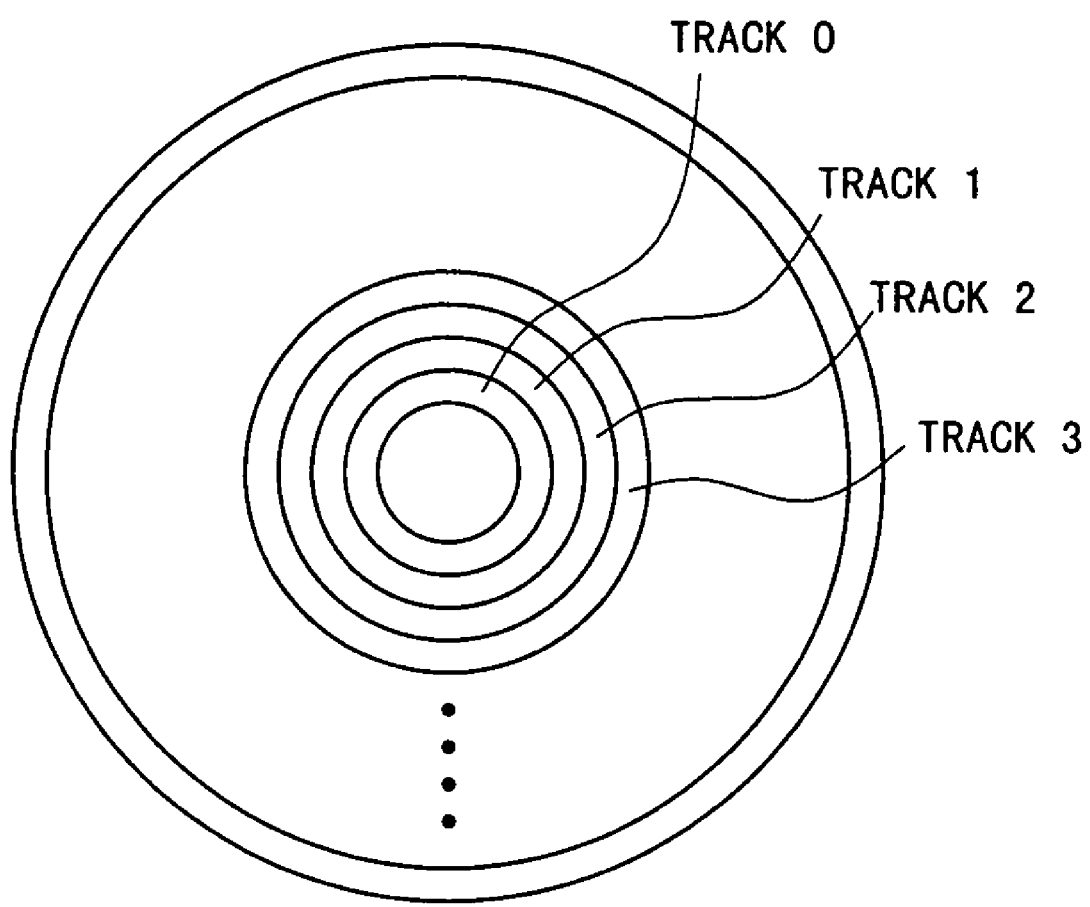
FIG. 4 is a diagram showing, by way of example, a data format of an optical disk loaded in the video game apparatus.

Details of processing carried out by the video game apparatus 1 will be described below. The package medium 100 loaded in the video game apparatus 1 has a data format as shown in FIG. 4, and stores various data in its tracks as shown in Table 2 below.

TABLE 2

| Track 0 | Disk number |
| --- | --- |
| | File name: track number, sector number |
| | File name: track number, sector number |
| | File name: track number, sector number |
| | . |
| | . |
| | . |
| Track 1 | AV data, program data, program data, . . . , AV data |
| Track 2 | Program data, program data, EOF, . . . , AV data |
| Track 3 | AV data, AV data, program data, . . . , EOF |
| . | . |
| . | . |
| . | . |

As shown in Table 2, the track 0, which is the innermost track on the package medium 100, records therein a disk number which is an ID for identifying the package medium 100, and file names corresponding to track numbers and sector numbers. The tracks 1, 2, 3, . . . , which are radially outward of the track 0, record therein AV data (image and sound data) to be actually processed, program data, and EOF (End Of File) data indicative of the ends of files. For example, the image and sound data comprise data compressed and encoded according to MPEG 2 (Moving Picture Experts Group 2).

Figure 5:
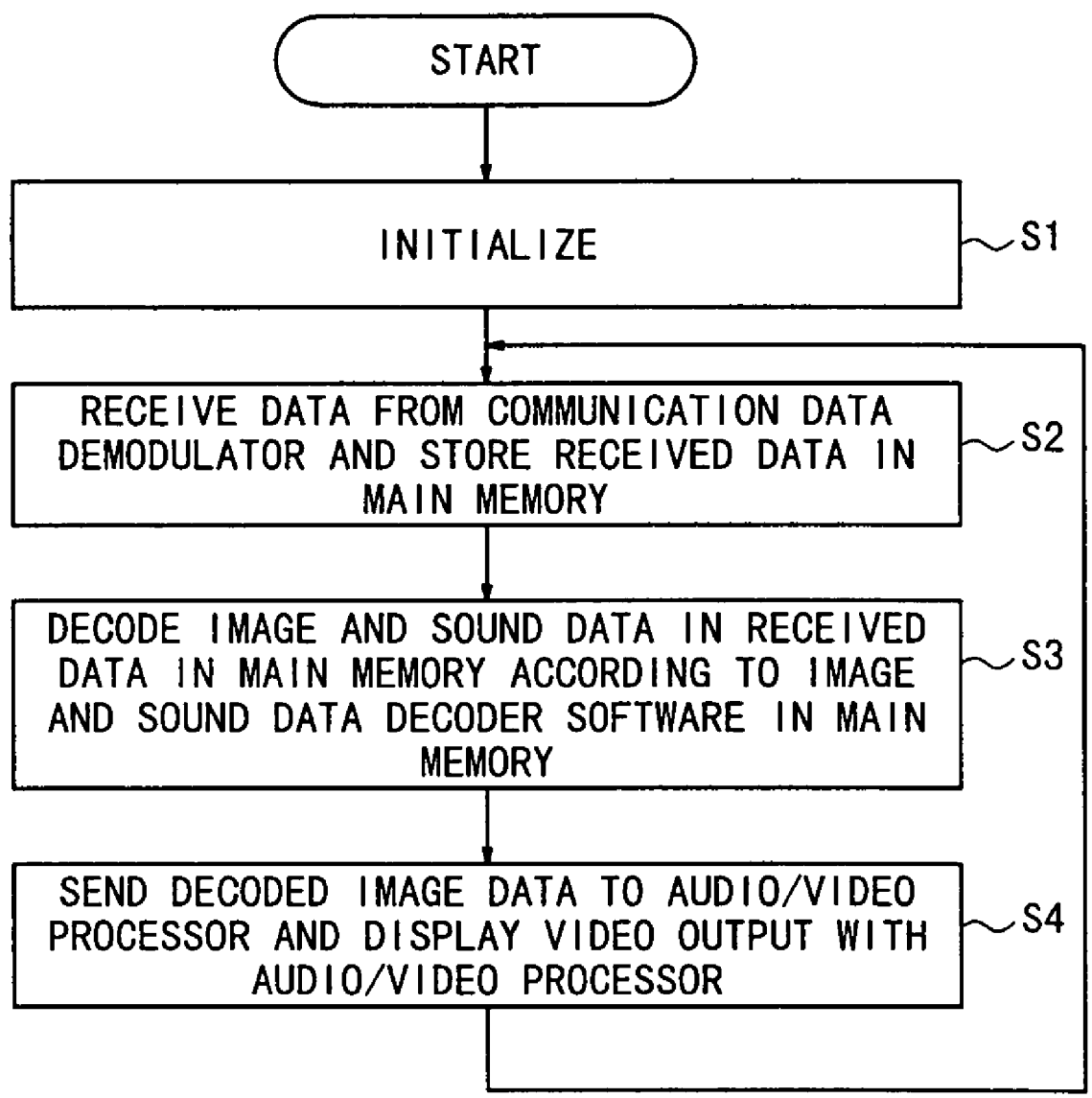
FIG. 5 is a flowchart of an operation sequence of the video game apparatus for receiving transmitted data and producing video and audio output signals based on the received data.

FIG. 5 shows an operation sequence of the video game apparatus 1 for receiving the transmitted data DT and producing video and audio output signals based on the received data (since the received data has essentially the same contents as the transmitted data DT, the transmitted data DT shown in FIG. 3 is interpreted as received data DR).

In step S1, the video game apparatus 1 initializes itself. Specifically, upon system startup of the video game apparatus 1, the video game apparatus 1 reads CPU software for decoding image and sound data, i.e., image and sound data decoder software, from a ROM (not shown) which stores a bootstrap program into the main memory 4. At the same time, the video game apparatus 10 reads CPU software for interpreting and processing special data $D_S$ of received data DR, i.e., special data processing software, into the main memory 4.

In step S2, the CPU 5 receives received data DR, which has essentially the same contents as the transmitted data DT shown in FIG. 3, from the communication data demodulator 3, and stores the received data DR in the main memory 4. In step S3, the CPU 5 decodes image and sound data $D_{AV}$, shown in FIG. 3, of the received data DR stored in the main memory 4, according to the image and sound data decoder software.

In step S4, the CPU 5 sends the decoded image and sound data to the audio/video processor 7 by way of DMA (Direct Memory Access) or the like. The audio/video processor 7 outputs the supplied image and sound data as an audio/video signal to the image and sound output device, which outputs reproduced audio and video information.

The video game apparatus 1 repeats the processing in steps S2 through S4 to play back the image and sound data $D_{AV}$ in the received data.

Figure 6:
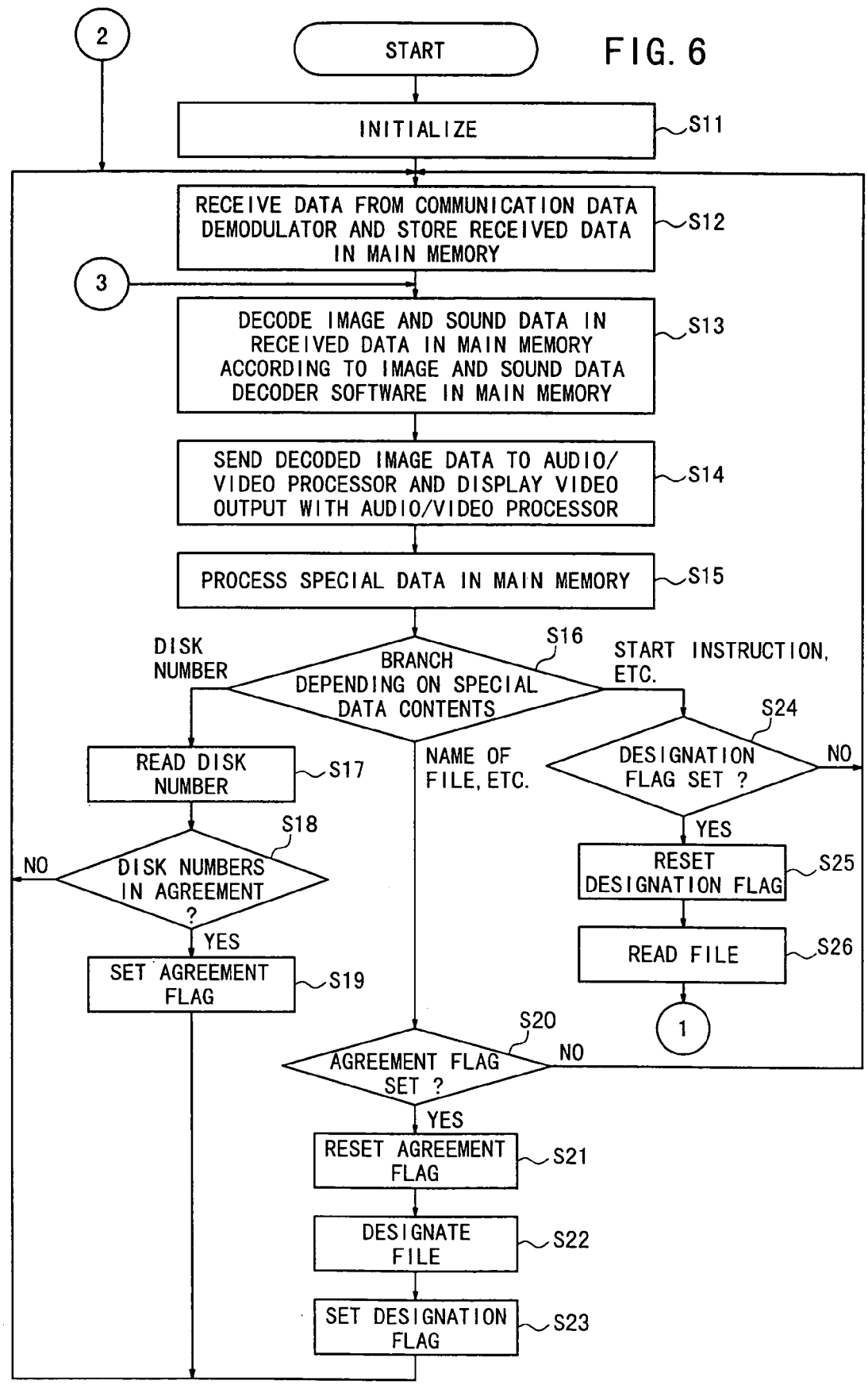
FIGS. 6 and 7 are a flowchart of an operation sequence of the video game apparatus for processing data and/or executing a program in a package medium indicated by received data.
Figure 7:
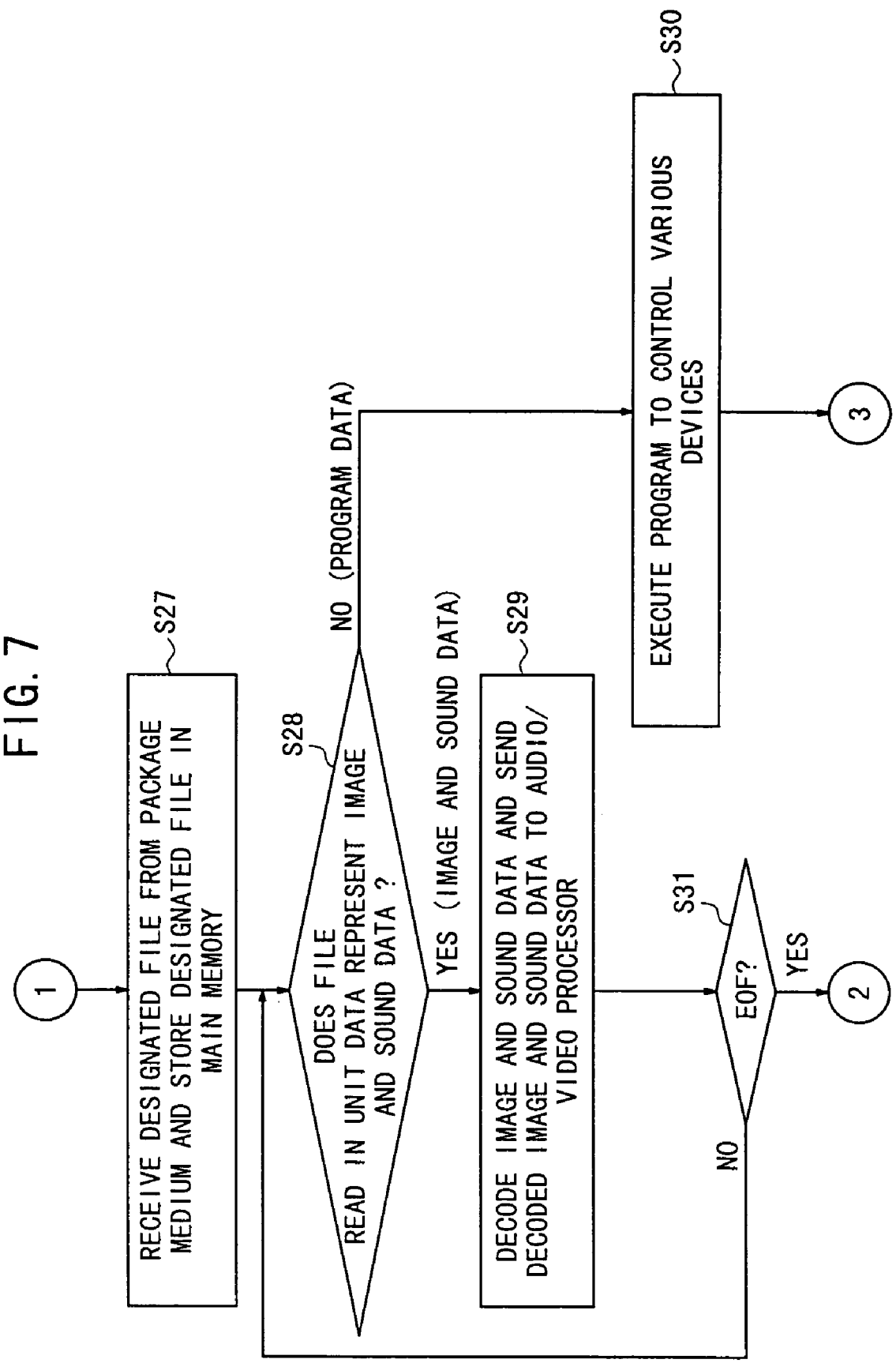

An operation sequence of the video game apparatus 1 for processing data held thereby and/or executing a program held thereby based on data added to the received data and data control information (special data $D_S$) which serves as information for executing the program will be described below. FIGS. 6 and 7 show such an operation sequence.

The video game apparatus 1 first executes steps S11 through S14 shown in FIG. 6. The processing in steps S11 through S14 is identical to the processing in steps S1 through S4 shown in FIG. 5. Specifically, the CPU 5 initializes the video game apparatus 1 in step S11. In step S12, the CPU 5 receives the received data DR from the communication data demodulator 3 and stores the received data DR in the main memory 4. In step S13, the CPU 5 decodes the image and sound data $D_{AV}$ in the received data DR stored in the main memory 4 according to the image and sound data decoder software.

In step S14, the CPU 5 sends the decoded image and sound data to the audio/video processor 7 by way of DMA or the like. The audio/video processor 7 outputs the supplied image and sound data as an audio/video signal to the television receiver 101, which outputs reproduced audio and video information.

The CPU 5 effects the processing in steps S11 through S14 on the image and sound data $D_{AV}$ in the received data DR stored in the main memory 4, and processes the special data (data control information) $D_S$ as follows:

In step S15, the CPU 5 processes the special data $D_S$, shown in FIG. 3, in the received data DR stored in the main memory 4. For example, the CPU 5 interprets the contents of the special data $D_S$ according to the special data processing software.

In step S16, the CPU 5 carries out branching depending on the contents of the special data $D_S$.

Specifically, if it is determined in step S16 that the contents of the special data $D_S$ represent a designated disk number (medium identification information shown in Table 1) which is the ID of a disk from which a designated file or track and sector of the package medium 100 are to be read, then the CPU 5 reads the disk number of the package medium 100 via the package medium demodulator 6, which serves as a reader, in step S17.

If it is determined in step S16 that the contents of the special data $D_S$ represent the name of an execution file to be read from the package medium 100 and executed, or track and sector numbers (the data position information shown in Table 1) where the execution file is recorded, then assuming that the condition in step S20 is satisfied and after step S21 is carried out, as described later on, the CPU 5 designates the name of the execution file to be processed in step S22.

If it is determined in step S16 that the contents of the special data $D_S$ represent either one of the instructions (start/end control information shown in Table 1) relative to the name of the execution file designated in step S22, then assuming that the condition in step S24 is satisfied and after step S25 is carried out, as described later on, the CPU 5 reads the execution file to be processed from the name of the execution file or the track and sector numbers where execution file is recorded in step S26.

The processing in steps S17 through S26 will be described in greater detail below.

In step S17, the CPU 5 instructs the package medium demodulator 6 to read the disk number or ID of the package medium 100 that is presently loaded. In step S18, the CPU 5 compares the read disk number with the designated disk number (designated ID) obtained from the received data DR by the processing of the special data $D_S$ in step S15.

If the designated disk number or the ID designated by the received data DR (the special data $D_S$) and the disk number or the ID of the package medium 100 which is read by the package medium demodulator 6 agree with each other in step S18, then the CPU 5 sets an agreement flag in step S19. Thereafter, control goes back to step S12 and the CPU 5 executes the processing in step S12 and subsequent steps.

If the compared disk numbers differ from each other in step S18, the CPU 5 executes the processing in step S12 and subsequent steps.

If it is determined in step S16 that the contents of the special data $D_S$ represent the name of an execution file to be executed, or track and sector numbers (the data position information shown in Table 1) where the execution file is recorded, then the CPU 5 decides whether the agreement flag set in step S19 has been set or not in step S20.

If the agreement flag has been set in step S20, i.e., if the disk number which is the ID designated by the received data DR and the disk number of the package medium 100 demodulated by the package medium demodulator 6 agree with each other, then the CPU 5 resets the agreement flag in step S21. Thereafter, the CPU 5 designates the name of the execution file to be processed in step S22.

The processing in step S22 is carried out on condition that the agreement flag indicative of agreement of the disk numbers has been set, the CPU 5 executes step S22 only if it is determined in step S18 that the disk to be processed, i.e., the package medium 100 whose disk number agrees with the designated disk number, is held by the video game apparatus 1.

In step S22, the CPU 5 designates the name of a file to be read, which represents medium data position information (see Table 1), or a file to be read with information of a track and a sector, with respect to the package medium 100. Thereafter, the CPU sets a designation flag in step S23, indicating information relative to the file to be read to the package medium demodulator 6. Then, the CPU 5 executes the processing in step S12 and subsequent steps again.

If the disk to be processed is not held by the video game apparatus 1 in step S18, i.e., if the agreement flag has not been set in step S20, then the CPU 5 does not execute step S22, but executes the processing in step S12 and subsequent steps.

The processing in step S26 is carried out only if the disk to be read is designated in step S22 and indicated to the package medium demodulator 6. Prior to step S26, therefore, the CPU 5 decides in step S24 whether the designation flag has been set or not in step S23. If the designation flag has been set, then the CPU 5 resets the designation flag in step S25. Thereafter, control proceeds to step S26.

In step S26, the CPU 5 instructs the package medium demodulator 6 to start reading the designated file according to the execution start instruction information which is represented by the start/end control information (see Table 1) in the received data stored in the main memory 4. Thereafter, control goes to step S27 shown in FIG. 7.

If no file is specified in step S22 and no instruction to read a file is given to the package medium demodulator 6, i.e., if it is determined in step S24 that the designation flag in step S23 has not been set, then the CPU 5 does not execute step S26, and executes the processing in step S12 and subsequent steps (NO in step S24).

In step S27, the CPU 5 receives the file read from the package medium 100 by the package medium demodulator 6, and stores the file in the main memory 4.

In step S28, the CPU 5 reads the stored file from the main memory 4 in terms of unit data, and decides whether the read file represents image and sound data or program data. If the read file represents image and sound data, then control goes to step S29. If the read file represents program data, then control goes to step S30.

In step S29, the CPU 5 decodes the image and sound data according to the image and sound data decoder software, and transfers the decoded data to the audio/video processor 7. The audio/video processor 7 then outputs the decoded data to the image and sound output device such as the television receiver 101. In this manner, given data recorded in the package medium 100, which is a recording medium having an ID designated by the received data DR, can be played back. Stated otherwise, after the reception of the received data DR, given data designated by the received data DR can be played back on a real-time basis.

In step S30, the CPU 5 executes a program represented by the program data, and controls various devices or components as instructed by the program. Specific examples of the processing in step S30 will be described in detail later on with reference to FIGS. 8 and 9.

After step S29, the CPU 5 decides in step S31 whether it has read the data of the file (designated file) stored in the main memory 4 to the end (EOF) thereof or not. If the CPU 5 has read the data of the file stored in the main memory 4 to the end (EOF) thereof, then the CPU 5 executes the processing in step S12 (see FIG. 6) and subsequent steps. If the CPU 5 has not read the data of the file stored in the main memory 4 to the end (EOF) thereof, then the CPU 5 executes the processing in step S28 and subsequent steps.

After step S30, the CPU 5 executes the processing in step S13 (see FIG. 6) and subsequent steps.

Figure 8:
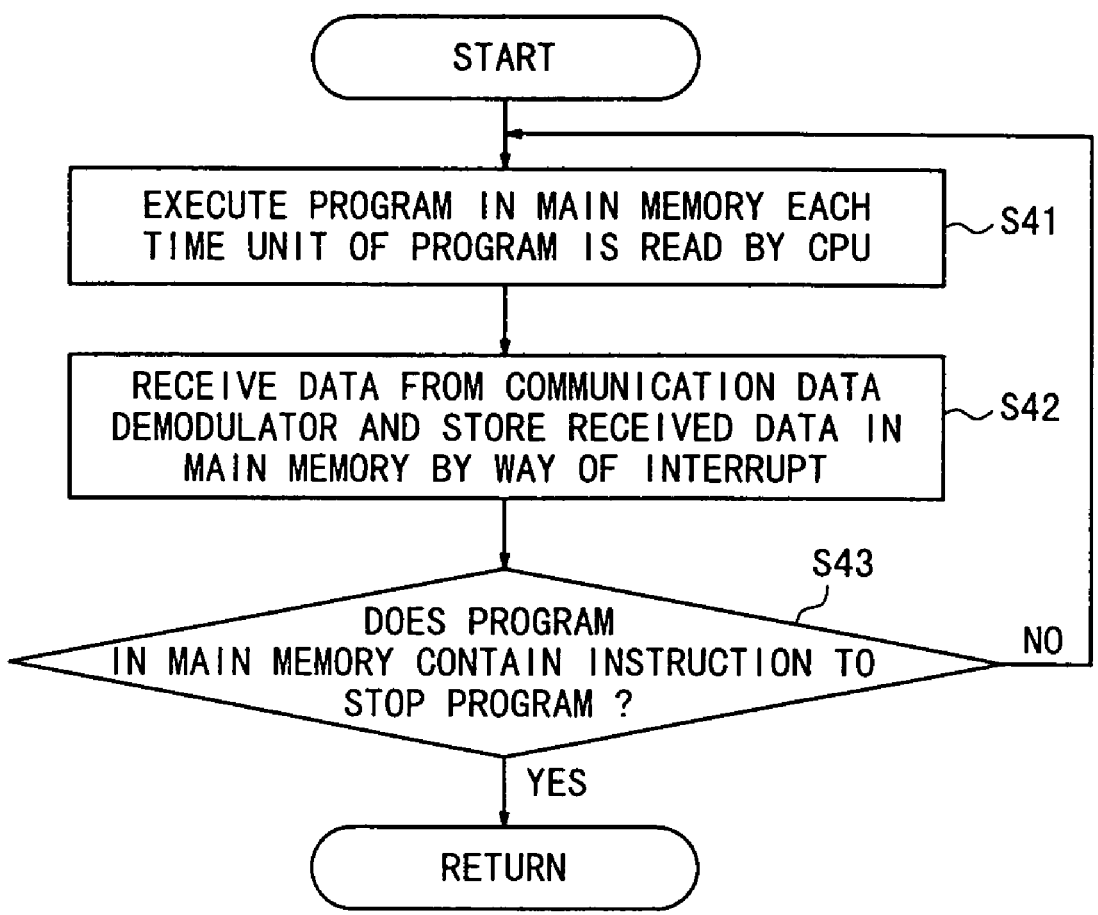
FIG. 8 is a flowchart of an operation sequence of the video game apparatus for carrying out a shift from the control of the processing of the data and the execution of the program from the package medium to the control of the processing and execution of the received data, according to instructions in the data and the program in the package medium.

FIG. 8 shows an example (Example 1) of the processing in step S30. Specifically, FIG. 8 shows an operation sequence of the video game apparatus 1 for carrying out a shift from the control of the processing of the data and the execution of the program from the package medium 100 to the control of the processing and execution of the received data, according to instructions in the data and the program in the package medium 100.

As shown in FIG. 8, the CPU 5 executes a program in the main memory 4 each time it reads a unit of the program in step S41. The program which is executed is a program originally recorded in the package medium 100 and read into and copied to the main memory 4 by the processing in steps S26, S27, and will be referred to as a "program Pa".

In step S42, the CPU 5 stores the received data DR from the communication data demodulator 3 in the main memory 4 by way of an interrupt or the like.

In step S43, the CPU 5 checks if there is an instruction to stop the program Pa in the program Pa stored in the main memory 4 or not.

If there no instruction to stop the program Pa, then the CPU 5 continuously executes the processing in step S41 and subsequent steps.

If there is an instruction to stop the program Pa, then the processing in step S30 shown in FIG. 8 is finished, and control returns to step S13 in FIG. 6.

In this fashion, the video game apparatus 1 can shift from the control according to the program Pa recorded in the package medium 100 again to the control according to the received data DR in step S13 and subsequent steps.

Figure 9:
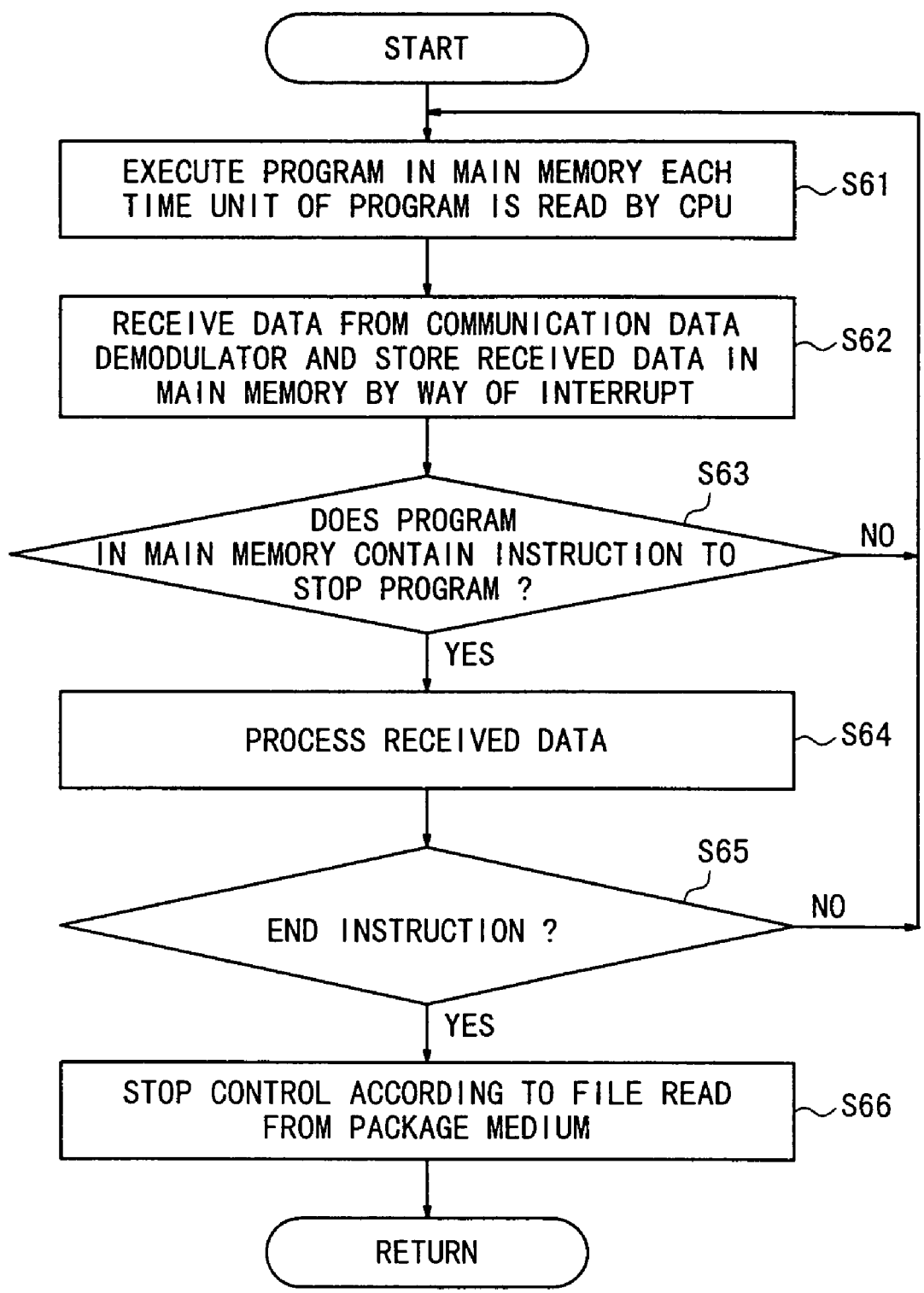
FIG. 9 is a flowchart of an operation sequence of the video game apparatus for carrying out a shift from the control of the processing of the data and the execution of the program from the package medium to the control of the processing and execution of the received data, according to instructions contained in the received data.

FIG. 9 shows another example (Example 2) of the processing in step S30. Specifically, FIG. 9 shows an operation sequence of the video game apparatus 1 for carrying out a shift from the control of the processing of the data and the execution of the program from the package medium 100 to the control of the processing and execution by the received data DR, according to instructions contained in the received data DR.

As shown in FIG. 9, the video game apparatus 1 executes the program Pa which has been in the main memory 4 by the processing in steps S26, S27, each time it reads a unit of the program Pa in step S61.

In step S62, the CPU 5 stores the received data DR from the communication data demodulator 3 in the main memory 4 by way of an interrupt or the like.

In step S63, the CPU 5 checks if there is an instruction to stop the program Pa in the program Pa stored in the main memory 4 or not.

If there no instruction to stop the program Pa, then the CPU 5 continuously executes the processing in step S61 and subsequent steps.

If there is an instruction to stop the program. Pa, then the CPU 5 temporarily stops the program Pa at the time, and processes the special data $D_S$ in the received data received in step S62 in step S64.

In step S65, the CPU 5 decides whether the special data $D_S$ contains the execution end instruction information or the forced end instruction information of the start/end control information (see Table 1) or not for thereby deciding whether to stop the control according to the program Pa read from the package medium 100 or not.

If the CPU 5 confirms that the special data $D_S$ contains neither the execution end instruction information nor the forced end instruction information in step S65, then the CPU 5 continues to execute the program Pa from where it has been temporarily stopped in step S63, in the processing in step S61 and subsequent steps.

If the CPU 5 confirms that the special data $D_S$ contains the execution end instruction information or the forced end instruction information in step S65, then control proceeds to step S66.

In step S66, the CPU 5 stops the control according to the execution file including the program Pa read from the package medium 100 into the main memory 4, according to the execution end instruction information or the forced end instruction information, and carries out the control processing in step S13 (see FIG. 6) and subsequent steps.

As described above, if the video game apparatus 1 detects an instruction to stop the program Pa while executing the program Pa in step S63, then the video game apparatus 1 temporarily stops executing the program Pa, and plays back the received data DR in step S64. Then, the video game apparatus 1 confirms whether the received data DR contains an instruction to end the execution of the program Pa or not in step S65. If the received data DR contains an instruction to end the execution of the program Pa, then the video game apparatus 1 ends the execution of the program Pa which has been stopped in step S63 in step S66, and then carries out the control processing in step S13 (see FIG. 6) and subsequent steps. If the received data DR does not contain an instruction to end the execution of the program Pa, then the video game apparatus 1 can resume the execution of the program Pa which has been stopped in step S63.

The video game apparatus 1 which operates in the manner described above offers the following various advantages:

The video game apparatus 1 can play back images and sounds on the television receiver 101 based on the image and sound data $D_{AV}$ contained in the received data DR which has been broadcast from the broadcasting station 11 via the antenna 14, received via the reception antenna 2, and demodulated by the communication data demodulator 3 (the processing in steps S12 through S14).

The video game apparatus 1 can interpret the contents of the special data $D_S$ which is control information in the received data DR, read a certain file (data or a program) from the package medium 100 held thereby, and execute the read file.

For example, the video game apparatus 1 can output images and sounds based on the image and sound data in the file (the processing in step S12) and execute the program Pa in the file (the processing in step S30).

While the program Pa in the file is being executed, the video game apparatus 1 can receive the received data DR and store the received data DR in the main memory (the processing in step S42).

If the program Pa which is being executed contains an instruction to stop the program Pa itself (YES in step S43), then the video game apparatus 1 can stop the program Pa, i.e., can stop the control according to the program Pa read from the package medium 100, and perform the control process according to the processing based on the received data in step S13 and subsequent steps.

In the above processing sequence, the control according to the data and program Pa read from the package medium 100 can be shifted to the control to execute and play back the received data DR according to an instruction from the data and program Pa (step S43). The instruction for the control shift is referred to as a control shift instruction from the package medium 100.

If instructed by the received data sent via communications (YES in step S65), the control according to the data and program Pa read from the package medium 100 can be shifted to the control to execute and play back the received data DR. The instruction for the control shift is referred to as a control shift instruction from the received data.

The data broadcasting system described above can be used in the following applications:

Heretofore, game software programs are sold at certain fixed dates. If a user wants to obtain a game software program as quickly as possible, then the user needs to buy it in a toy store, a retail store, etc. at the date set for sale. The game software program may not start being sold in the available stores at exactly the same time across the nation.

If a game software program is sold in association with the above data broadcasting system, then even if different users purchase the game software program at different dates, the game software program may produce essentially the same effect as if it started being sold at exactly the same time across the nation.

Figure 10:
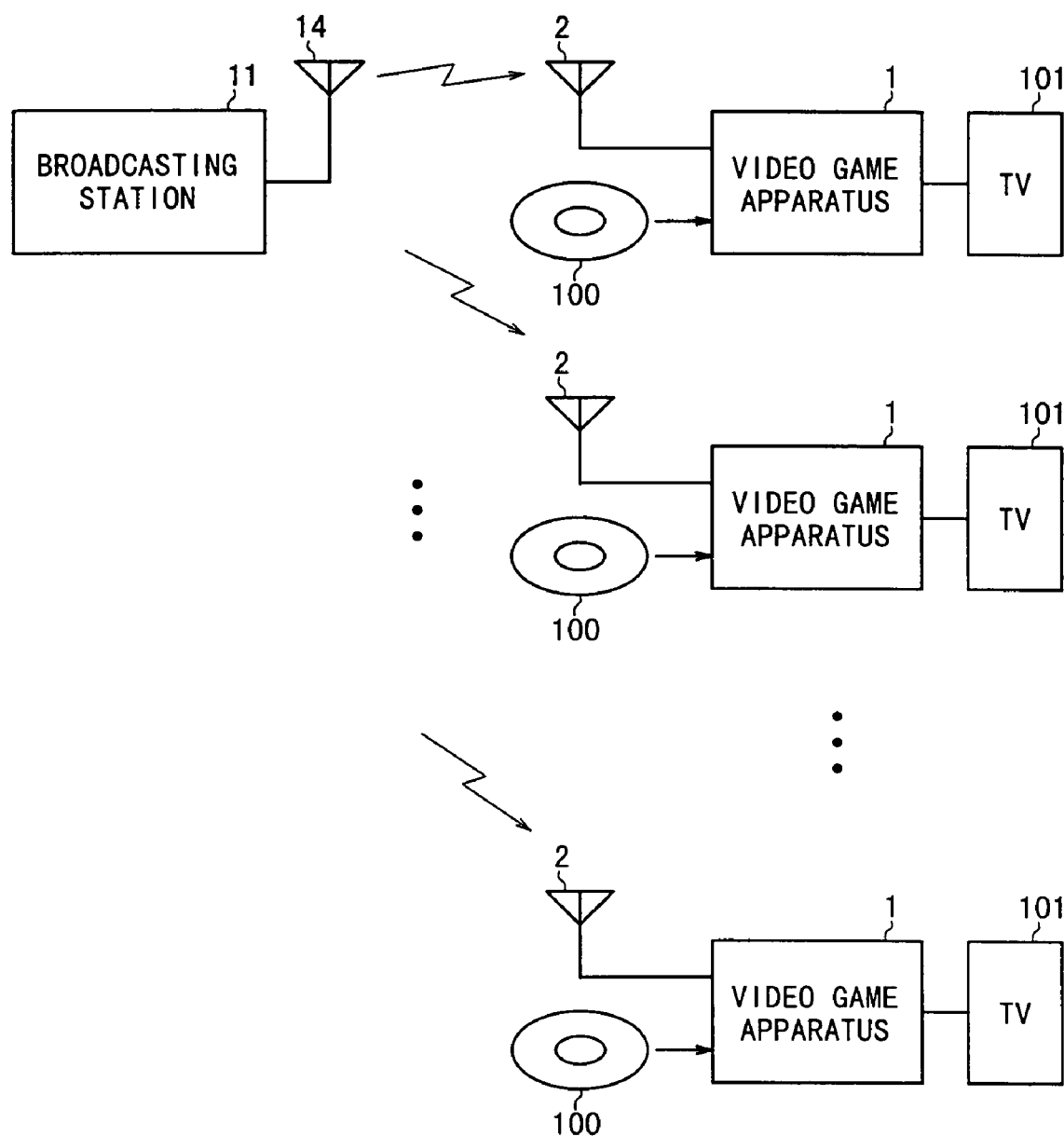
FIG. 10 is a block diagram of a data transmitting and receiving system in which a plurality of video game apparatus execute a given program simultaneously based on transmitted data of the same contents from one broadcasting station.

Specifically, FIG. 10 shows a data transmitting and receiving system in which each user has the video game apparatus 1 to which the television receiver 101 and the reception antenna 2 are connected. Each of the users of the video game apparatus 1 buys a package medium 100 storing a game program, etc. therein, and starts to operate the video game apparatus 1 loaded with the package medium 100 and waits for data control information at a certain date and time.

The broadcasting station 11 broadcasts data control information to start the game program, i.e., transmits data DT, via the antenna 14, at the certain date and time.

In each of the video game apparatus 10, the game program starts being executed by the reception of the data control information (see Table 1) transmitted by the broadcast, specifically, by the reception of the designated disk number or ID of a recording medium. The video game apparatus 10 which serve as the data receiving apparatus can substantially simultaneously execute the game program or process data in the package mediums 100 with a certain ID. Consequently, even if the users do not go to stores to purchase the game program at a date set for sale, the same effect is produced as if the users bought the game program simultaneously at the date set for sale.

Figure 11:
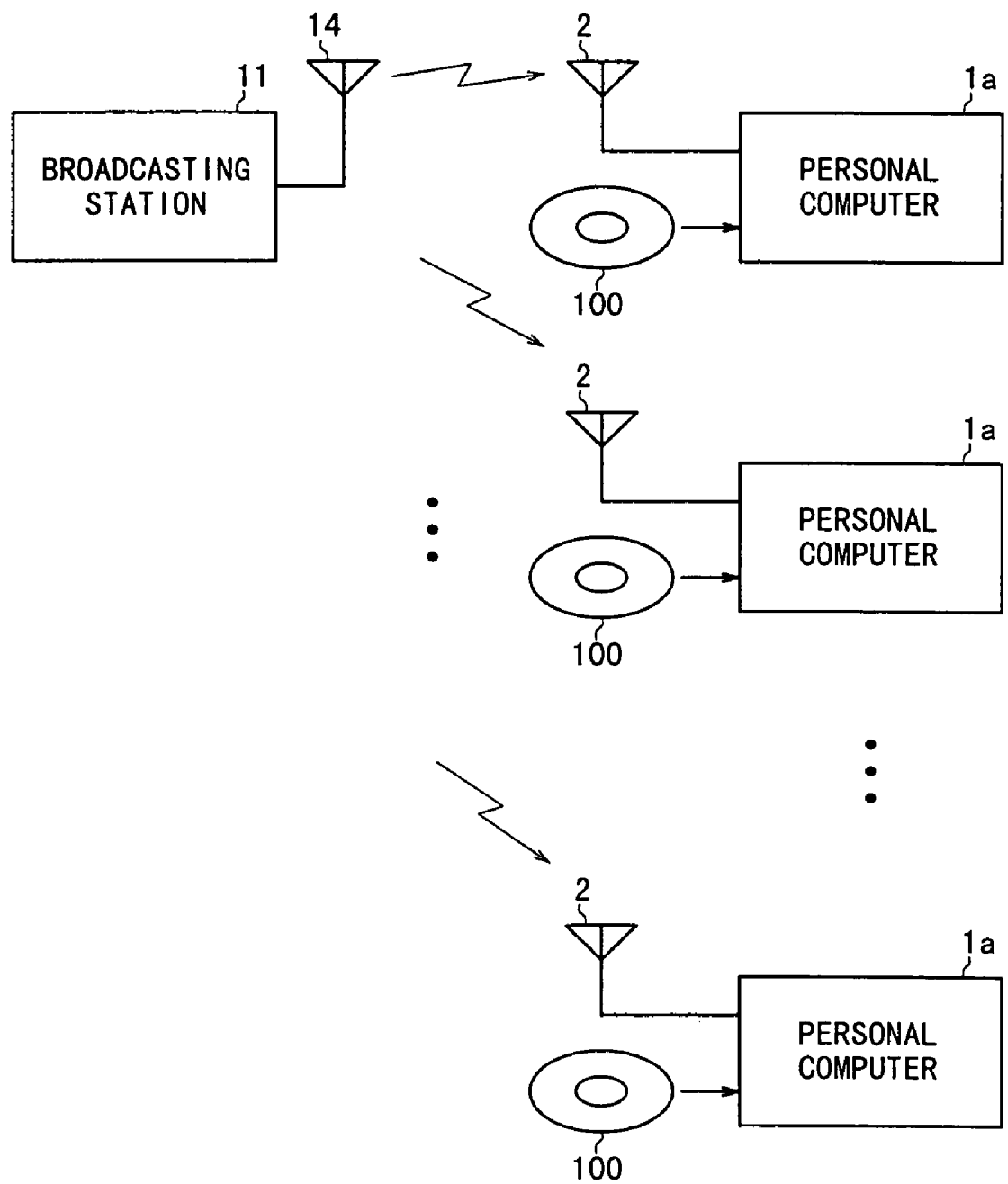
FIG. 11 is a block diagram of a data transmitting and receiving system in which a plurality of personal computers execute a given program simultaneously based on transmitted data of the same contents from one broadcasting station.

FIG. 11 shows a data transmitting and receiving system designed for conducting a trial test for students to take across the nation.

As shown in FIG. 11, the data transmitting and receiving system comprises a single broadcasting station 11 and a plurality of personal computers 1a each having a function as a data receiving apparatus. Each of the personal computers comprises a main body, a monitor, an input device including a keyboard and a mouse, and a printer, if necessary.

Each of the users of the personal computers 1a buys a package medium 100 which stores a trial test program. At a predetermined time on the date of the trial test, each user starts to operate the personal computer 1a loaded with the package medium 100. At this time, the personal computer 1a functions as an assistive device for assisting in the execution of the trial test.

The broadcasting station 11 broadcasts data control information to start the trial test program stored in the package medium 100, i.e., transmits data DT, via the antenna 14, at the predetermined time on the trial test date.

The trial test is started by the execution of the trial test program read from the package medium 100 based on the data control information (see Table 1) transmitted from the broadcasting station 11.

According to the above procedure, it is possible to start the trial test simultaneously across the nation.

After the trial test, the trial test program may freely be executed by any user, so that the trial test program may be used as a program for reviewing the problems given in the trial test.

One package medium 100 may store a plurality of programs for different trial tests designed for students of various grades, so that the package medium 100 allows the different trial tests to be conducted at desired times.

The trial test or tests can be carried out by not only the personal computer 1a, but also the video game apparatus 1 or any of various other information processing apparatus.

As described above, the data broadcasting system according to the present invention is capable of providing software contents, e.g., entertainment software contents, based on real-time communications and package medium interactivity.

The data broadcasting system according to the present invention is also capable of providing software contents, e.g., a simultaneously progressive game, based on simultaneous communications and package medium interactivity.

Furthermore, the data broadcasting system according to the present invention is capable of providing software contents based on the advantages of a package medium by storing a large amount of data, which are not economical if transmitted by communications, in the package medium. For example, such software contents may include a publication such as a disk-edition Corporate Quarterly Handbook linked with news broadcasts, a shopping service for providing a TV shopping catalog in a package medium and displaying the products in the TV shopping catalog through a TV broadcast, and an on-line education service for providing a textbook in a package medium and controlling the package medium with a broadcast.

An entertainment system as a specific example of the video game apparatus 1 will be described below with reference to FIGS. 12 through 19. In FIGS. 12 through 19, the entertainment system includes a video game apparatus 301.

Figure 12:
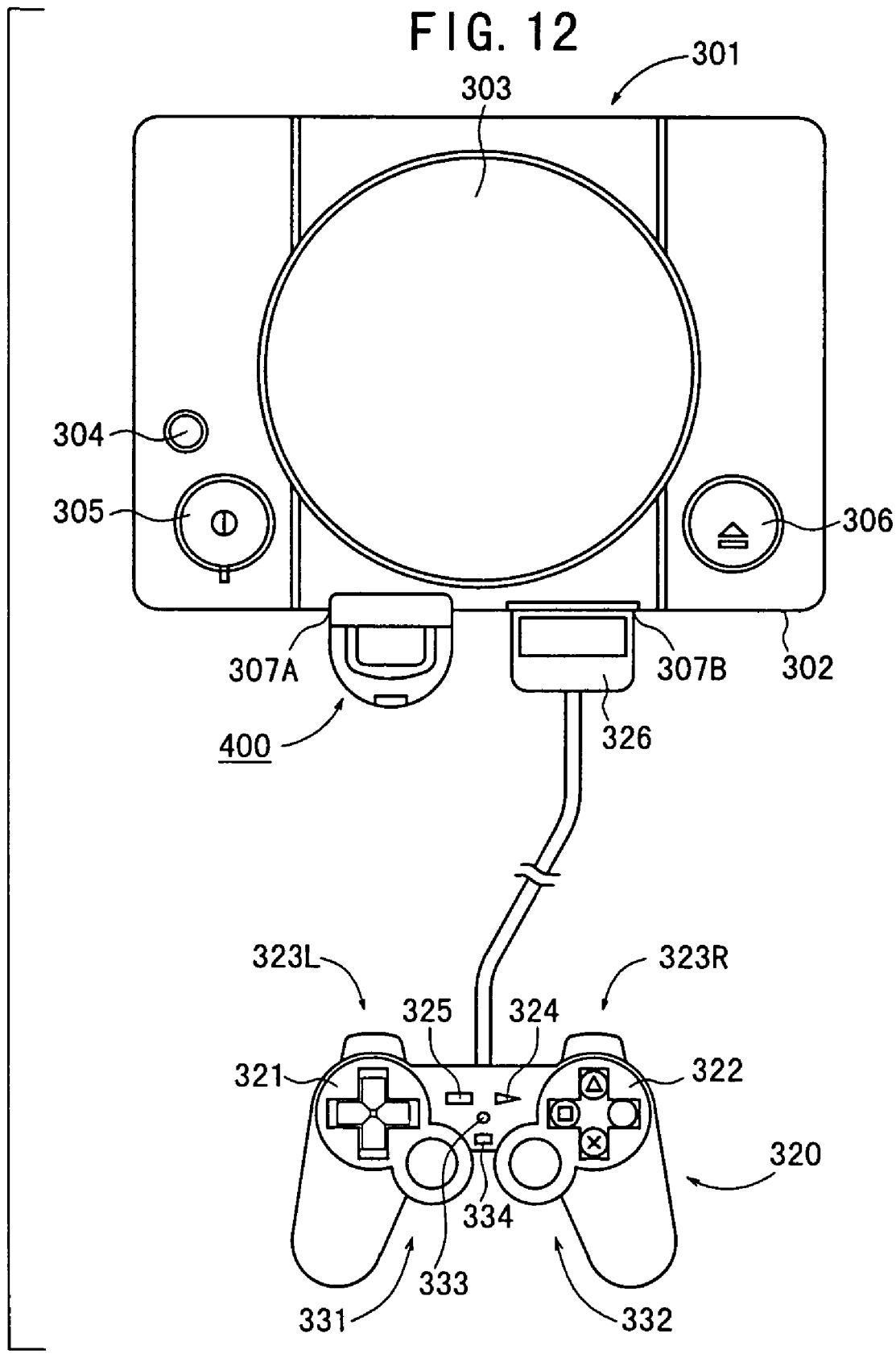
FIG. 12 is a plan view of an entertainment system which comprises a portable electronic device and a video game apparatus.
Figure 13:
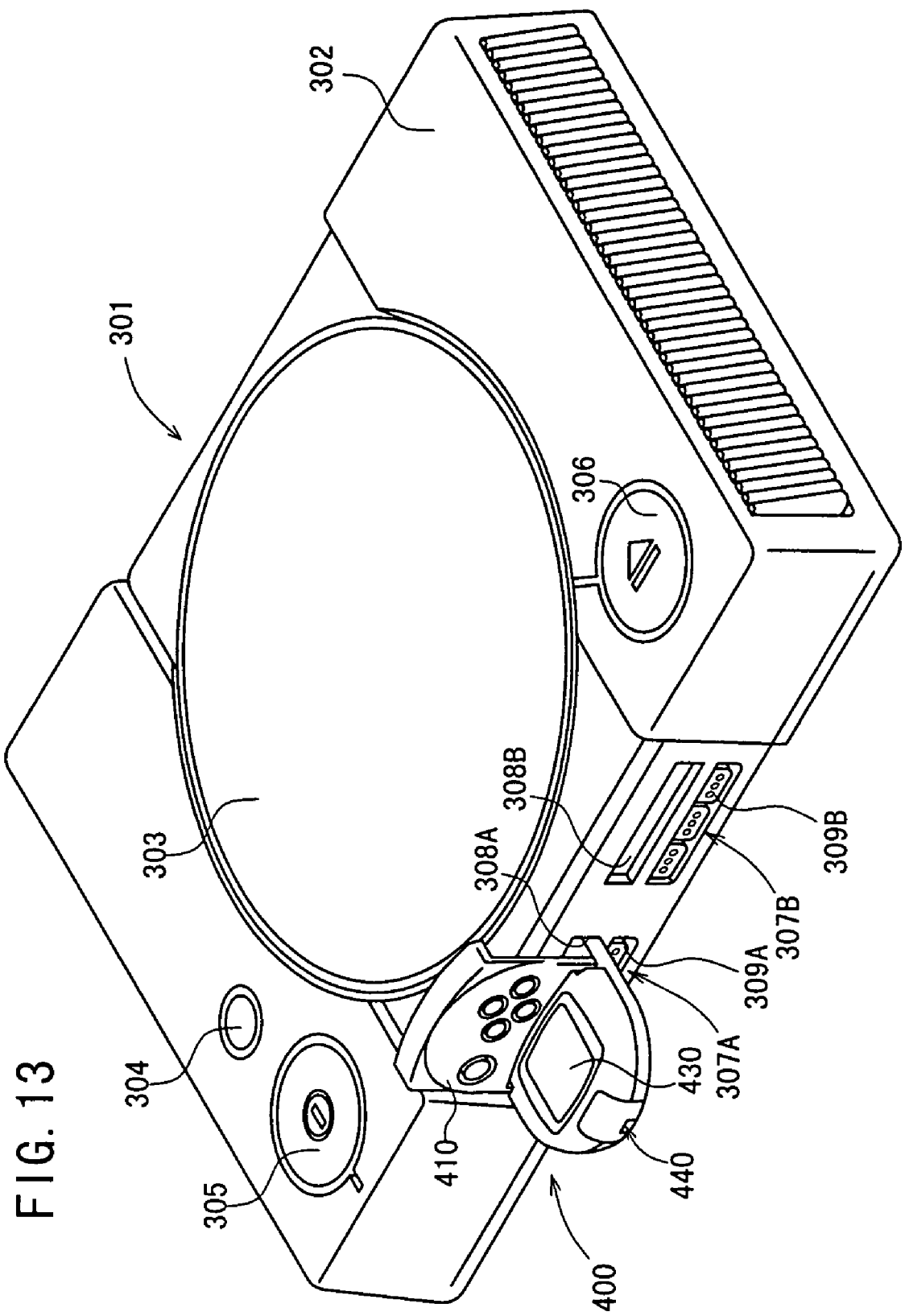
FIG. 13 is a perspective view of the entertainment system.

As shown in FIGS. 12 and 13, the entertainment system comprises, in addition to the video game apparatus 301, a portable electronic device 400 removably connected to the video game apparatus 301 for performing data communications with the video game apparatus 301, and a manual controller 320 for supplying user's control input signals to the video game apparatus 301.

In the entertainment system, the video game apparatus 301 serves as a master unit and the portable electronic device 400 as a slave unit. For example, the video game apparatus 301 in the entertainment system is arranged as a means for executing a game program recorded in a recording medium such as a CD-ROM or the like. The video game apparatus 301 has a data reception function to receive data transmitted by broadcasts. In this embodiment, the portable electronic device 400 also has a data reception function to receive data transmitted by broadcasts.

The video game apparatus 301 reads an application program from a recording medium, and executes the application program according to instructions from the user, i.e., the game player. For example, the video game apparatus 301 executes a game program mainly to control the progress of a game, the display of game images, and the output of sounds.

The video game apparatus 301 has a rectangular casing 302 which houses a disk loading unit 303 substantially centrally therein for loading an optical disk such as a CD-ROM or the like as a recording medium for supplying an application program such as a video game program or the like. The casing 302 supports a reset switch 304 for resetting a video game, a power supply switch 305, a disk control switch 306 for controlling the loading of the optical disk, and two slots assemblies 307A, 307B.

The video game apparatus 301 may be supplied with an application program via a communication link, rather than being supplied from the recording medium. For example, the video game apparatus 301 may be able to receive data from a communication link such as a broadcasting link or the like.

The portable electronic device 400 and the manual controller 320 can be connected to the slot assemblies 307A, 307B. Specifically, the portable electronic device 400 can be connected to slots 308A, 308A in the slot assemblies 307A, 307B, and the manual controller 320 can be connected to slots 309A, 309A in the slot assemblies 307A, 307B.

The manual controller 320 has first and second control pads 321, 322, a left button 323L, a right button 323R, a start button 324, a selector button 325, analog control pads 331, 332, a mode selector switch 333 for selecting control modes for the analog control pads 331, 332, and an indicator 334 for indicating a selected control mode. The manual controller 320 also has a vibration imparting mechanism (not shown) disposed therein for imparting vibrations to the manual controller 320 depending on how the video game proceeds. The manual controller 320 is electrically connected to the slot 307B in the casing 302 by a connector 326.

If two manual controllers 320 are connected respectively to the slots 307A, 307B, two users or game players can share the entertainment system to play a competition game, for example. The video game apparatus 301 may have more or less than two slots 307A, 307B.

Figure 14:
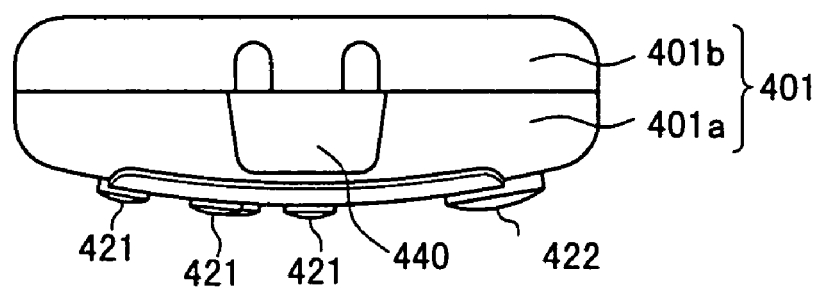
FIG. 14 is a plan view of the portable electronic device.
Figure 15:
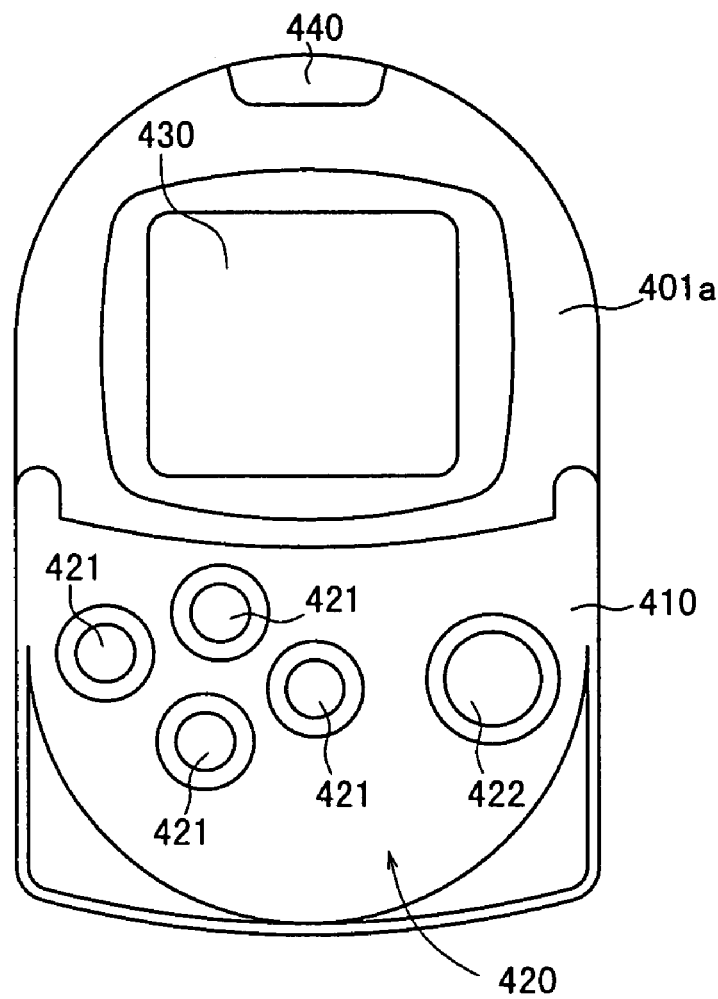
FIG. 15 is a front elevational view of the portable electronic device shown in FIG. 14.
Figure 16:
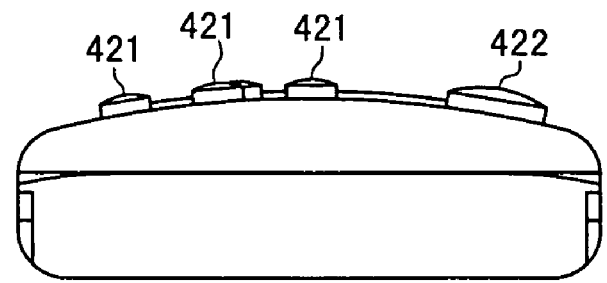
FIG. 16 is a bottom view of the portable electronic device shown in FIG. 14.

As shown in FIGS. 14 through 16, the portable electronic device 400 has a housing 401 which supports a manual control pad 420 for entering various items of information, a display unit 430 such as a liquid crystal display (LCD) unit or the like, and a window 440 for wireless communication such as infrared communication with a wireless communication command unit.

The housing 401 comprises an upper shell 401a and a lower shell 401b, and houses a board which supports memory devices, etc. thereon. The housing 401 is shaped so as to be insertable into either one of the slots 307A, 307B in the casing 302.

The window 440 is mounted on a substantially semicircular end of the housing 401. The display unit 430 occupies a substantially half area of the upper shell 401a of the housing 401, and is positioned near the window 440.

The manual control pad 420 has a plurality of control buttons 421, 422 for entering events and making various selections. The manual control pad 420 occupies the other substantially half area of the upper shell 401a, and is positioned remotely from the window 440. The manual control pad 420 is disposed on a lid 410 that is angularly movably supported on the housing 401. The control buttons 421, 422 extend through the lid 410 from its upper surface to its lower surface. The control buttons 421, 422 are supported on the lid 410 for movement into and out of the upper surface of the lid 410.

The portable electronic device 400 has a board disposed in the housing 410 and facing the lid 410 as it is closed over the housing 401. The board supports a plurality of switch pressers held in alignment with the respective control buttons 421, 422 when the lid 410 is closed over the housing 401. When one of the control buttons 421, 422 is pressed by the user, it actuates the corresponding switch presser to press a pressure switch such as a diaphragm switch, for example.

As shown in FIG. 13, the portable electronic device 400 with the lid 410 being open is inserted into the slot 307A in the casing 302 of the video game apparatus 301.

Figure 17:
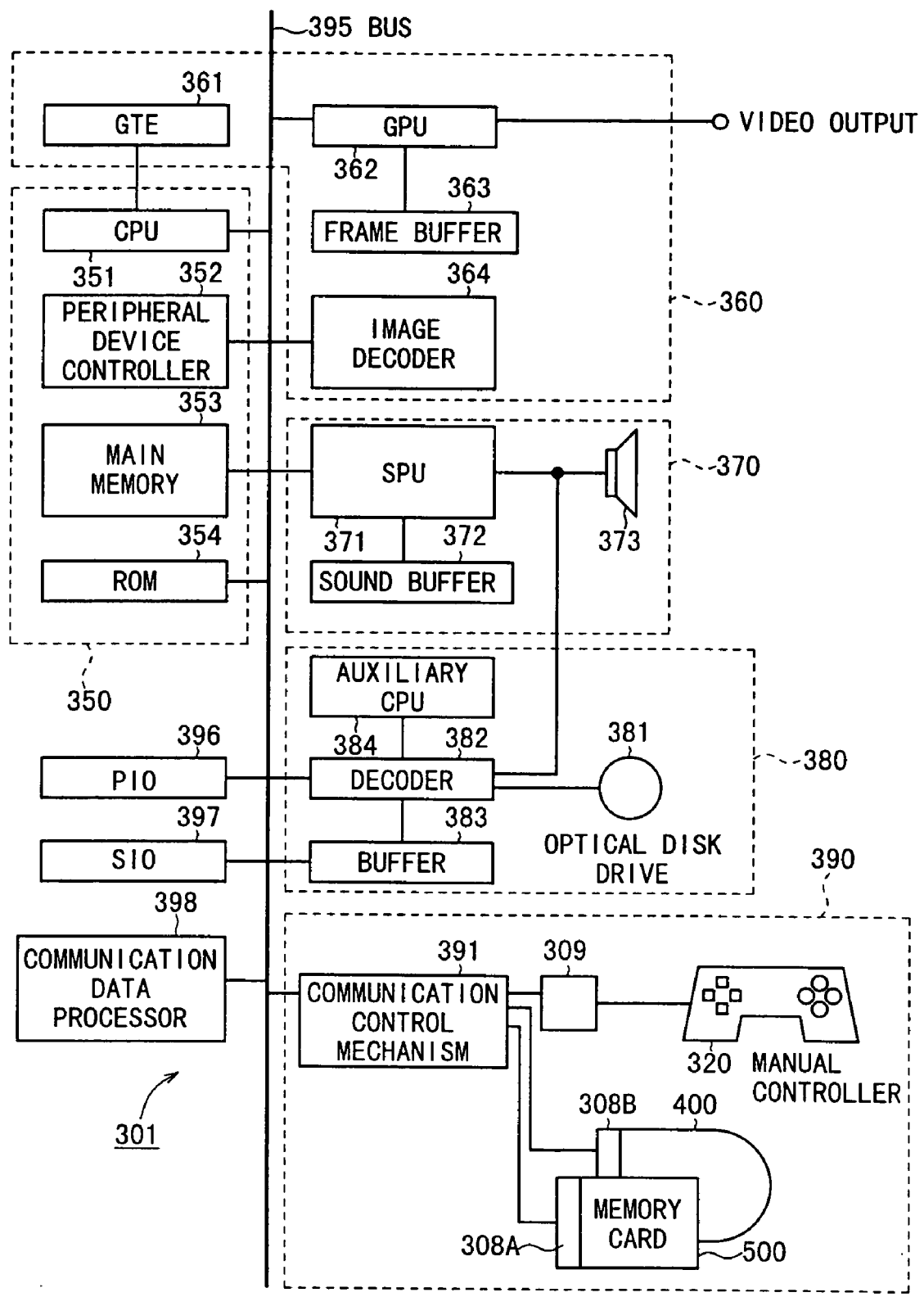
FIG. 17 is a block diagram of the video game apparatus.
Figure 18:
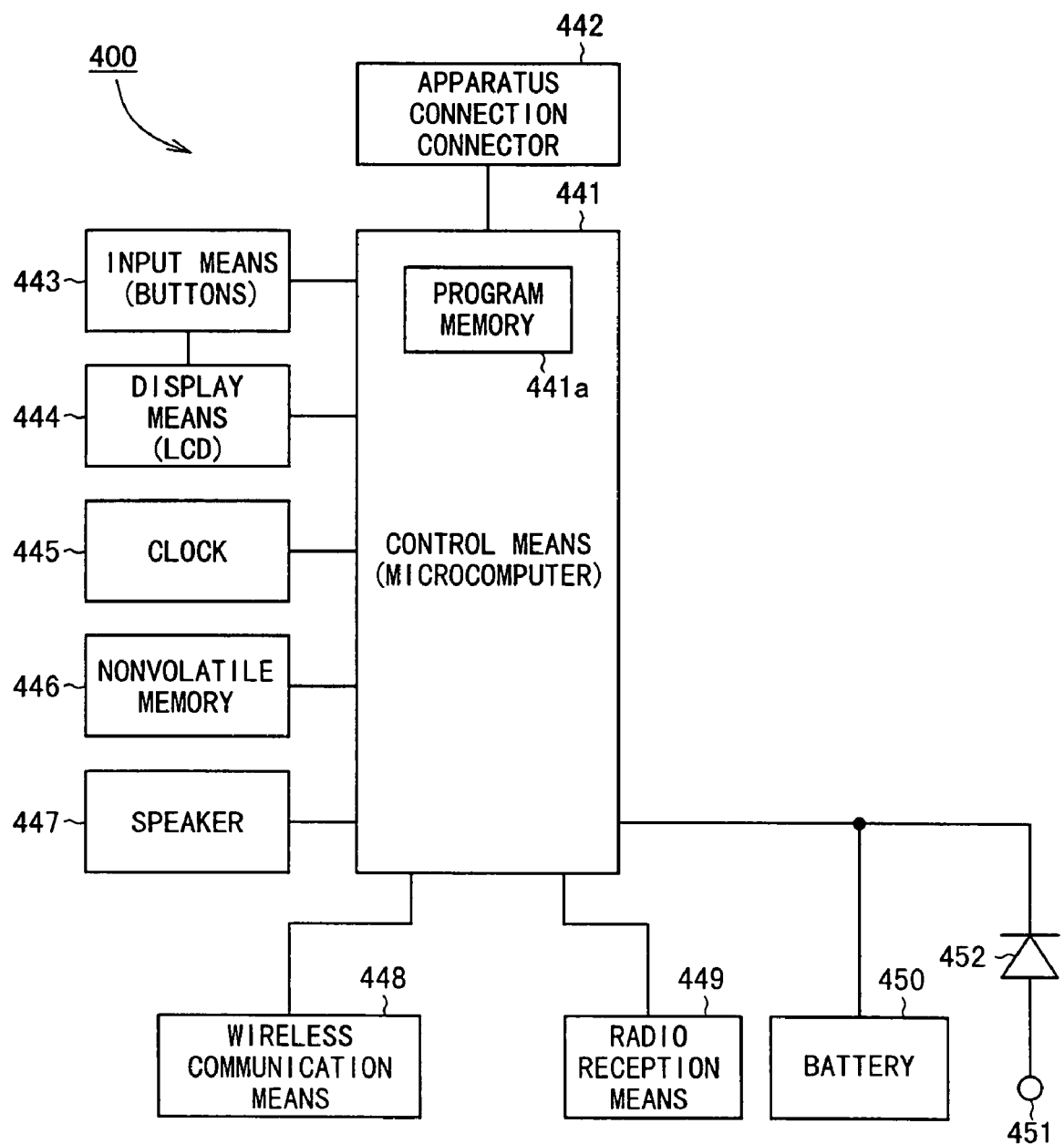
FIG. 18 is a block diagram of the portable electronic device.

FIGS. 17 through 19 show circuit arrangements of the video game apparatus 301 and the portable electronic device 400.

As shown in FIG. 17, the video game apparatus 301 comprises a control system 350 including a central processing unit (CPU) 351 and its peripheral devices, a graphic system 360 including a graphic processing unit (GPU) 362 for plotting image data in a frame buffer 363, a sound system 370 including a sound processing unit (SPU) 371 for generating music sounds and sound effects, an optical disk controller 380 for controlling an optical disk in which application programs are recorded, a communication controller 390 for controlling signals from the manual controller 320 which enter instructions from the user, and data supplied to and from the memory card 500 which stores game settings and the portable electronic device 400, a bus 395 to which the control system 350, the graphic system 360, the sound system 370, the optical disk controller 380, and the communication controller 390 are connected, a parallel I/O interface (PIO) 396, a serial I/O interface (SIO) 397 which interface another apparatus, and a communication data processor 398 for receiving and processing broadcast data, etc.

The control system 350 comprises a CPU 351, a peripheral device controller 352 for controlling direct memory access (DMA) data transfer, a main memory 353 comprising a random-access memory (RAM), and a read-only memory (ROM) 354.

The CPU 351, the main memory 353, the graphic system 360 and the sound system 370, the optical disk controller 380, and the communication data processor 398 of the video game apparatus 301 correspond respectively to the CPU 3, the main memory 4, the audio/video processor 7, the package medium demodulator 6, and the communication data demodulator 3 of the video game apparatus 1.

The main memory 353 is arranged as a memory means for storing various data. The main memory 353 corresponds to the main memory 4 of the video game apparatus 1, and stores received data, and a program and data read from the package medium.

The ROM 354 is arranged as a memory means for storing various programs such as an operating system or the like for managing the main memory 353, the graphic system 360, and the sound system 370.

The CPU 351 controls the video game apparatus 301 in its entirety by executing the operating system stored in the ROM 354.

The CPU 351 corresponds to the CPU 5 of the video game apparatus 1, and has a data processing control function to control the processing of data such as an application program held by the main memory 353 based on data control information included in received data.

When the video game apparatus 301 is turned on, the CPU 351 executes the operating system stored in the ROM 354 to start controlling the graphic system 360, the sound system 370, etc. For example, when the operating system is executed, the CPU 351 initializes the video game apparatus 301 in its entirety for confirming its operation, and thereafter controls the optical disc controller 380 to execute an application program recorded in the optical disk. As the application program is executed, the CPU 351 controls the graphic system 360, the sound system 370, etc. depending on instructions entered from the user for thereby controlling the display of images and the generation of music sounds and sound effects.

The graphic system 360 comprises a geometry transfer engine (GTE) 361 for performing coordinate transformations and other processing, a graphic processing unit (GPU) 362 for generating image data according to commands from the CPU 351, a frame buffer 363 for storing image data generated by the GPU 362, and an image decoder 364 for decoding image data compressed and encoded by an orthogonal transform such as a discrete cosine transform.

The GTE 361 has a parallel arithmetic mechanism for performing a plurality of arithmetic operations parallel to each other, and can perform coordinate transformations, light source calculations, matrixes, or vectors at a high speed in response to a request from the CPU 351. Specifically, the GTE 361 can calculate the coordinates of a maximum of 1.5 million polygons per second for a flat shading process to plotting one triangular polygon with one color, for example. With the GTE 361, the video game apparatus 301 is able to reduce the burden on the CPU 351 and perform high-speed coordinate calculations.

According to an image generating command from the CPU 351, the GPU 362 generates and stores a polygon or the like in the frame buffer 363. The GPU 362 is capable of generating a maximum of 360 thousand polygons per second.

The frame buffer 363 comprises a dual-port RAM, and is capable of simultaneously storing image data generated by the GPU 363 or image data transferred from the main memory 353, and reading image data for display. The frame buffer 363 has a storage capacity of 1 Mbytes, for example, and is handled as a 16-bit matrix made up of a horizontal row of 1024 pixels and a vertical column of 512 pixels.

The frame buffer 363 has a display area for storing image data to be outputted as video output data, a CLUT (color look-up table) area for storing a color look-up table which will be referred to by the GPU 362 when it generates a polygon or the like, and a texture area for storing texture data to be subjected to coordinate transformations when a polygon is generated and mapped onto a polygon plotted by the GPU 362. The CLUT area and the texture area are dynamically varied as the display area is varied.

The image decoder 364 is controlled by the CPU 351 to decode image data of a still or moving image stored in the main memory 353, and store the decoded image into the main memory 353. Image data reproduced by the image decoder 364 is transferred to the frame buffer 363 by the GPU 362, and can be used as a background for an image plotted by the GPU 362.

The sound system 370 comprises an SPU 371 for generating music sounds, sound effects, etc. based on commands from the CPU 351, a sound buffer 372 for storing waveform data from the SPU 371, and a speaker 373 for outputting music sounds, sound effects, etc. generated by the SPU 371.

The SPU 371 has an ADPCM (adaptive differential PCM) function for reproducing 16-bit sound data which has been encoded as 4-bit differential sound data by ADPCM, a reproducing function for reproducing the waveform data stored in the sound buffer 372 to generate sound effects, etc., and a modulating function for modulating and reproducing the waveform data stored in the sound buffer 372.

The sound system 370 can be used as a sampling sound source which generates music sounds, sound effects, etc. based on the waveform data stored in the sound buffer 372 according to commands from the CPU 351.

The graphic system 360 and the sound system 370 correspond to the audio/video processor 7 of the video game apparatus 1, and are arranged as a processing system for outputting images and sounds from the image and sound output device.

The optical disk controller 380 comprises an optical disk drive 381 for reproducing application programs and data recorded on an optical disk such as a CD-ROM or the like, a decoder 382 for decoding programs and data that are recorded with an error correcting code added thereto, and a buffer 383 for temporarily storing data read from the optical disk drive 381 so as to allow the data from the optical disk to be read at a high speed. An auxiliary CPU 384 is connected to the decoder 382.

The optical disk controller 380 is arranged to perform the function of the package medium demodulator 6 of the video game apparatus 1. Specifically, the optical disk controller 380 has a function to demodulate an application program and data which are recorded in an optical disk as the package medium 100.

Sound data recorded on the optical disk which is read by the optical disk drive 381 includes PCM data converted from analog sound signals, in addition to the ADPCM data. The ADPCM data, which is recorded as 4-bit differential data of 16-bit digital data, is decoded by the decoder 382, supplied to the SPU 371, converted thereby into analog data, and applied to drive the speaker 373. The PCM data, which is recorded as 16-bit digital data, is decoded by the decoder 382 and then applied to drive the speaker 373.

The communication controller 390 comprises a communication control mechanism 391 for controlling communication with the CPU 351 via the bus 395, a controller connector 309 to which the manual controller 320 for entering instructions from the user is connected, and a pair of memory card insertion units or slots 308A, 308B (see also FIG. 13) for receiving the memory card 500 as an auxiliary memory device for storing game settings, etc. and the portable electronic device 400, the memory card insertion units 308A, 308B being controlled by the communication control mechanism 391.

The communication data processor 398 is arranged to have a function to receive information via an antenna (not shown). Specifically, the communication data processor 398 serves to perform the function of the communication data demodulator 3 of the video game apparatus 1. Therefore, the communication data processor 398 demodulates transmitted data broadcast from a broadcasting station.

As shown in FIG. 18, the portable electronic device 400 comprises a control means 441, a apparatus connection connector 442, an input means 443, a display means 444, a clock function unit 445, a nonvolatile memory 446, a speaker 447, a wireless communication means 448 and a radio reception means 449 as a data transmitting/receiving means, a battery 450, and a power supply terminal 451 and a diode 452 as a power supply means.

The control means 441 comprises a microcomputer, for example. The control means 441 has a program memory 441a disposed therein as a program storage means.

The apparatus connection connector 442 serves as a connection means for connecting to a slot of another information-handling apparatus or the like. For example, the apparatus connection connector 442 is arranged to perform a data communication function to transmit data to and receive data from the video game apparatus 301.

The input means 443 comprises control buttons for controlling a program stored in the program memory 441a.

The display means 444 comprises a liquid crystal display unit or the like for displaying various items of information.

The clock function unit 445 is arranged to display time on the display means 444, for example.

The nonvolatile memory 446 serves to store various data. For example, the nonvolatile memory 446 comprises a semiconductor memory such as a flash memory which is capable of retaining stored data even when the portable electronic device 400 is turned off.

Since the portable electronic device 400 has the battery 450, the nonvolatile memory 446 may comprise a static random-access memory (SRAM) capable of storing and reading data at a high speed.

The battery 450 also allows the portable electronic device 400 to be operable independently even when the portable electronic device 400 is removed from the slots 307A, 307B in the casing 302 of the video game apparatus 301.

The battery 450 comprises a chargeable secondary battery. When the portable electronic device 400 is inserted in either one of the slots 307A, 307B in the casing 302 of the video game apparatus 301, the battery 450 is supplied with electric energy from the video game apparatus 301. Specifically, the battery 450 has a terminal connected to the power supply terminal 451 via a reverse-current prevention diode 452. When the portable electronic device 400 is connected to the casing 302, electric energy is supplied from the power supply terminal 451 via the reverse-current prevention diode 452 to the battery 450.

The wireless communication means 448 is arranged to perform data communications with another memory card or the like through an infrared radiation or the like. The wireless communication means 448 is also arranged to receive various data sent from another memory card or the like.

The radio reception means 449 comprises an antenna, a demodulator circuit, etc., and is arranged to receive various data transmitted by a radio broadcast.

The speaker 447 is constructed as a sound generating means for generating sounds according to a program.

The above components or means of the portable electronic device 400 are connected to the control means 441, and are operated under the control of the control means 441.

FIG. 19 shows control items of the control means 441. As shown in FIG. 19, the control means 441 has an apparatus connection interface for connection to an information-handling apparatus, a memory interface for outputting data to and inputting data from a memory, a display interface, a control input interface, a sound interface, wireless communication interface, a clock management interface, and a program download interface.

The video game apparatus 301 and the portable electronic device 400 jointly make up the entertainment system.

The video game apparatus 301 of the above structure can execute a video game based on a game program recorded in an optical disk which is loaded in the optical disc controller 380.

The video game apparatus 301 is also capable of starting a program in an optical disk held thereby based on data control information included in the received data broadcast from the broadcasting station 11. Furthermore, the video game apparatus 301 can process image and sound data included in the received data according to the started program.

The portable electronic device 400, with the input means 443 such as button switches for controlling a program being executed, and the display means 444 comprising a liquid crystal display unit or the like, functions as a portable game device for running a game application.

The portable electronic device 400 also has a function to download an application program from the video game apparatus 301 and store the downloaded application program in the program memory 441a in the microcomputer 441. Thus, it is easy to modify an application program and various driver software that run on the portable electronic device 400.

The portable electronic device 400 may have functions that the video game apparatus 301 have. Specifically, the portable electronic device 400 may have a function to start a program held thereby based on data control information included in the received data broadcast from the broadcasting station 11. In this case, the microcomputer 411 of the portable electronic device 400 has the same functions as the CPU 5 of the video game apparatus 1, e.g., a data processing control function to control the processing of data such as an application program stored in the program memory 441a based on the data control information $D_S$ included in the received data.

Accordingly, the portable electronic device 400 can start a program held thereby based on the data control information $D_S$ included in the received data broadcast from the broadcasting station 11.

According to the present invention, as described above, the data receiving apparatus is capable of executing a program and/or processing data in a recording medium such as a package medium that is designated by data received via a wired link or a wireless link.

The control under the program in the recording medium may be shifted to the control to play back the received data under an instruction contained in the received data.

The control under the program in the recording medium may be stopped and resumed based on the contents of the received data.

If the ID of a recording medium designated by the received data agrees with the ID of a recording medium read by a recording medium reader, then a plurality of data receiving apparatus having respective recording medium readers can read a program and/or data from the recording mediums via the recording medium readers and substantially simultaneously start executing the program and/or processing the data.

The data receiving apparatus may comprise a video game apparatus or an apparatus including a personal computer.

The data transmitting apparatus according to the present invention transmits data including the ID of a certain recording medium. Therefore, an apparatus which receives the data transmitted from the data transmitting apparatus is capable of performing a control process in relation to the ID of the certain recording medium.

According to the present invention, new software contents can be realized which allow free movement between a world provided by communication data that are both real-time and simultaneous, and a world provided by an interactive recording medium.

Stated otherwise, it is possible to provide software contents, e.g., entertainment software contents, based on real-time communications and recording medium interactivity such as package medium interactivity.

It is also possible to provide software contents, e.g., a simultaneously progressive game, based on simultaneous communications and recording medium interactivity. Specifically, programs and/or data in recording mediums of a plurality of physically spaced computers or video game apparatus can simultaneously be executed and/or processed on the basis of data received via communications.

Furthermore, with a large amount of data, which are not economical if transmitted by communications, being stored in a recording medium such as a CD-ROM, a DVD, or the like, it is possible to provide software contents based on the advantages of both mediums which may be a communication medium and a recording medium. For example, such software contents may include a publication such as a disk-edition Corporate Quarterly Handbook linked with news broadcasts, a shopping service for providing a TV shopping catalog in a package medium and displaying the products in the TV shopping catalog through a TV broadcast, and an on-line education service for providing a textbook in a package medium and controlling the package medium with a broadcast.

Although certain preferred embodiments of the present invention have been shown and described in detail, it should be understood that various changes and modifications may be made therein without departing from the scope of the appended claims.

What is claimed is:

1. A data transmitting and receiving system comprising a data transmitting apparatus and a data receiving apparatus,
   said data receiving apparatus having a reader for reading a recording medium with a recorded ID and control means;
   said control means comprising means for controlling said reader to read a program and/or data from said recording medium and executing the program and/or processing the data if an ID designated by data received by said data receiving apparatus agrees with the recorded ID of said recording medium which is read by said reader;
   wherein said received data designating the ID is received by broadcast.

2. A data transmitting and receiving system according to claim 1, wherein said control means comprises:
   means for stopping executing said program and playing back the received data if an instruction to stop said program is detected in said program while said program is being executed.

3. A data transmitting and receiving system according to claim 1, wherein said control means comprises:
   means for temporarily stopping executing said program and playing back the received data if an instruction to stop said program is detected in said program while said program is being executed, confirming whether the received data being played back contains an instruction to end the execution of said program which is being temporarily stopped or not, ending the execution of said program which is being temporarily stopped if the received data being played back contains an instruction to end the execution of said program, and resuming the execution of said program if the received data being played back does not contain an instruction to end the execution of said program.

4. A data transmitting and receiving system comprising a data transmitting apparatus and a plurality of data receiving apparatus,
   each of said data receiving apparatus having a reader for reading a recording medium with a recorded ID and control means;
   said control means comprising means for controlling said reader to read a program and/or data from said recording medium and substantially simultaneously starting to execute the program and/or process the data if an ID designated by data received by each of said data receiving apparatus agrees with the recorded ID of said recording medium which is read by said reader;
   wherein said received data designating the ID is received by broadcast.

5. A data receiving apparatus having a data reception function, comprising:
   a reader for reading a recording medium having an ID specifying itself; and
   control means for controlling said reader to read a program and/or data from said recording medium and executing the program and/or process the data if an ID designated by received data agrees with the recorded ID of said recording medium which is read by said reader;
   wherein said received data designating the ID is received by broadcast.

6. A data receiving apparatus according to claim 5, wherein said control means comprises:

means for stopping executing said program and playing back the received data if an instruction to stop said program is detected in said program while said program is being executed.

7. A data receiving apparatus according to claim 5, wherein said control means comprises:
   means for temporarily stopping executing said program and playing back the received data if an instruction to stop said program is detected in said program while said program is being executed, confirming whether the received data being played back contains an instruction to end the execution of said program which is being temporarily stopped or not, ending the execution of said program which is being temporarily stopped if the received data being played back contains an instruction to end the execution of said program, and resuming the execution of said program if the received data being played back does not contain an instruction to end the execution of said program.

8. A data receiving apparatus according to claim 5, comprising a video game apparatus.

9. A data receiving apparatus according to claim 5, comprising a personal computer.

10. A data transmitting apparatus for transmitting data to a data receiving apparatus, comprising:
    means for transmitting data containing an ID of a particular recording medium, the ID transmitted by broadcast,
    wherein said particular recording medium is provided on the side of said data receiving apparatus.

11. A data transmitting apparatus according to claim 10, wherein the transmitted data contains the name of a file in said particular recording medium and/or data identifying a recording area in said particular recording medium.

12. A data transmitting and receiving system according to claim 1, wherein:
    said data receiving apparatus further comprises an antenna; and
    said received data designating the ID is received by said data receiving apparatus through said antenna.

13. A data transmitting and receiving system according to claim 4, wherein:
    said data receiving apparatus further comprises an antenna; and
    said received data designating the ID is received by said data receiving apparatus through said antenna.

14. A data receiving apparatus according to claim 5, wherein:
    said data receiving apparatus further comprises an antenna; and
    said received data designating the ID is received by said data receiving apparatus through said antenna.

15. A data transmitting apparatus according to claim 10, wherein:
    said data transmitting apparatus further comprises an antenna; and
    said transmitted data including the ID is transmitted by said data transmitting apparatus through said antenna.

16. A data transmitting apparatus according to claim 10, further comprising:
    means for broadcasting data control information to start a game program residing on said particular recording medium.

* * * * *